(12) United States Patent
Wang et al.

(10) Patent No.: US 12,267,829 B2
(45) Date of Patent: Apr. 1, 2025

(54) PARAMETER CONFIGURATION METHOD AND COMMUNICATIONS APPARATUS

(71) Applicant: HUAWEI TECHNOLOGIES CO., LTD., Guangdong (CN)

(72) Inventors: Xiaohan Wang, Shanghai (CN); Huangping Jin, Shanghai (CN); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 813 days.

(21) Appl. No.: 17/370,438

(22) Filed: Jul. 8, 2021

(65) Prior Publication Data

US 2021/0337565 A1 Oct. 28, 2021

Related U.S. Application Data

(63) Continuation of application No. PCT/CN2020/070484, filed on Jan. 6, 2020.

(30) Foreign Application Priority Data

Jan. 9, 2019 (CN) .......................... 201910021166.4

(51) Int. Cl.
*H04W 72/1263* (2023.01)
*H04W 72/044* (2023.01)
(Continued)

(52) U.S. Cl.
CPC ... *H04W 72/1263* (2013.01); *H04W 72/0453* (2013.01); *H04W 72/046* (2013.01); *H04W 72/54* (2023.01)

(58) Field of Classification Search
None
See application file for complete search history.

(56) References Cited

U.S. PATENT DOCUMENTS 7,782,970 B2 * 8/2010 Shao ...................... H04L 1/0631
375/267
10,439,845 B1 * 10/2019 Heath, Jr. ............ H04B 7/0452
(Continued)

FOREIGN PATENT DOCUMENTS

CN          1969522 A        5/2007
CN       101656601 A    *   2/2010
(Continued)

OTHER PUBLICATIONS

Samsung, "SLS evaluation on Type II overheard reduction," 3GPP TSG RAN WG1 Meeting #95; Spokane, USA, Nov. 12-16, 2018, R1-1813007.*

(Continued)

*Primary Examiner* — Andrew C Oh
(74) *Attorney, Agent, or Firm* — Fish & Richardson P.C.

(57) ABSTRACT

This application provides a parameter configuration method and a communications apparatus. The method includes: receiving, by a terminal device, an indication of a first mapping relationship from a network device, where the first mapping relationship is a mapping relationship in a preconfigured first mapping relationship group, and the first mapping relationship group includes at least one mapping relationship, to indicate at least one correspondence between a reporting quantity of spatial domain vectors and a reporting quantity of frequency domain vectors; and determining, by the terminal device, the reporting quantity of spatial domain vectors and the reporting quantity of frequency domain vectors based on the first mapping relationship.

15 Claims, 5 Drawing Sheets

(51) Int. Cl.
*H04W 72/0453* (2023.01)
*H04W 72/54* (2023.01)

(56) References Cited

U.S. PATENT DOCUMENTS

| | | | | |
|---|---|---|---|---|
| 2012/0300867 | A1* | 11/2012 | Chen | H04B 7/0456 |
| | | | | 375/267 |
| 2014/0098780 | A1* | 4/2014 | Kim | H04W 72/0446 |
| | | | | 370/329 |
| 2014/0140317 | A1* | 5/2014 | Mobasher | H04B 7/024 |
| | | | | 370/330 |
| 2015/0365145 | A1* | 12/2015 | Schober | H04B 7/0486 |
| | | | | 375/267 |
| 2016/0278003 | A1 | 9/2016 | Kim et al. | |
| 2017/0195032 | A1* | 7/2017 | Huang | H04B 7/0413 |
| 2017/0250743 | A1* | 8/2017 | Jöngren | H04L 25/03343 |
| 2019/0028305 | A1* | 1/2019 | Zhang | H04B 7/0634 |

FOREIGN PATENT DOCUMENTS

| | | | | | |
|---|---|---|---|---|---|
| CN | 101273548 | B | * | 12/2010 | H04B 7/0634 |
| CN | 1878159 | B | * | 4/2012 | H04L 1/0643 |
| CN | 102710390 | A | * | 10/2012 | |
| CN | 102833053 | A | * | 12/2012 | H04L 1/1887 |
| CN | 107181562 | A | | 9/2017 | |
| CN | 107276650 | A | * | 10/2017 | |
| CN | 110474665 | A | * | 11/2019 | H04B 7/0456 |
| CN | 110768700 | A | * | 2/2020 | H04B 7/0417 |
| CN | 110830092 | A | * | 2/2020 | H04B 7/0456 |
| CN | 110855336 | A | * | 2/2020 | H04B 7/0456 |
| CN | 111064499 | A | * | 4/2020 | H04B 7/0417 |
| CN | 111106857 | A | * | 5/2020 | H04B 7/0413 |
| CN | 111181609 | A | * | 5/2020 | H04B 7/0456 |
| CN | 111342873 | A | * | 6/2020 | H04B 7/0417 |
| CN | 111342912 | A | * | 6/2020 | H04B 17/309 |
| CN | 111342913 | A | * | 6/2020 | H04B 17/309 |
| CN | 110474665 | B | * | 2/2021 | H04B 7/0456 |
| CN | 112636802 | A | * | 4/2021 | H04B 7/0456 |
| CN | 111010218 | B | * | 6/2021 | H04B 7/0408 |
| CN | 111416645 | B | * | 11/2021 | H04B 7/0456 |
| CN | 112533295 | B | | 11/2021 | |
| CN | 111106857 | B | * | 5/2022 | H04B 7/0413 |
| DE | 102013223236 | A1 | * | 5/2014 | H04B 1/62 |
| EP | 1608081 | A2 | * | 12/2005 | H04B 7/068 |
| EP | 2169944 | A1 | * | 3/2010 | H04N 1/6086 |
| EP | 2330762 | A1 | * | 6/2011 | G06F 17/141 |
| EP | 2552167 | A1 | * | 1/2013 | H04W 28/048 |
| EP | 2658314 | A1 | * | 10/2013 | H04W 16/24 |
| EP | 3038270 | A1 | | 6/2016 | |
| EP | 3879716 | A1 | * | 9/2021 | H04B 7/0408 |
| JP | 2012010337 | A | * | 1/2012 | |
| JP | 7214071 | B2 | * | 1/2023 | H04B 7/0456 |
| TW | 201735597 | A | * | 10/2017 | H04B 7/0413 |
| WO | WO-2006137609 | A1 | * | 12/2006 | B62D 65/12 |
| WO | WO-2008024462 | A2 | * | 2/2008 | H04L 1/0003 |
| WO | 2008069579 | A1 | | 6/2008 | |
| WO | WO-2011020359 | A1 | * | 2/2011 | H04B 7/0452 |
| WO | WO-2012035425 | A1 | * | 3/2012 | H04B 7/0426 |
| WO | WO-2014069913 | A1 | * | 5/2014 | H04B 7/0413 |
| WO | WO-2014199437 | A1 | * | 12/2014 | H04W 24/00 |
| WO | WO-2015143605 | A1 | * | 10/2015 | H04B 7/0456 |
| WO | WO-2015161518 | A1 | * | 10/2015 | H04B 7/0452 |
| WO | WO-2017096954 | A1 | * | 6/2017 | H04B 17/336 |
| WO | WO-2018024064 | A1 | * | 2/2018 | H04B 1/0017 |
| WO | WO-2018196589 | A1 | * | 11/2018 | H04B 7/0456 |
| WO | WO-2019086114 | A1 | * | 5/2019 | H04J 11/0033 |
| WO | WO-2019144801 | A1 | * | 8/2019 | H04B 7/0456 |
| WO | WO-2020043282 | A1 | * | 3/2020 | H04B 7/0417 |
| WO | WO-2020078251 | A1 | * | 4/2020 | H04B 7/0417 |
| WO | WO-2020083057 | A1 | * | 4/2020 | H04B 7/0413 |

OTHER PUBLICATIONS

Office Action in Chinese Appln. No. 201910021166.4, dated May 7, 2023, 6 pages.
Extended European Search Report issued in European Application No. 20738409.0 on Feb. 16, 2022, 7 pages.
Huawei et al., "The impact of basis vectors for codebook enhancement," 3GPP TSG RAN WG1 Meeting #95, R1-1813692, Spokane, USA, Nov. 12-16, 2018, 4 pages.
Samsung, "SLS evaluation on Type II overhead reduction," 3GPP TSG RAN WG1 Meeting #95, R1-1813007, Spokane, USA, Nov. 12-16, 2018, 6 pages.
Samsung, Summary of CSI enhancement for MU-MIMO support. 3GPP TSG RAN WG1 Meeting #95, R1-1813002, Spokane, USA, Nov. 12-16, 2018, 9 pages.
Huawei, HiSilicon, "Discussion on CSI enhancement," 3GPP TSG RAN WG1 Meeting #95, R1-1812242, Spokane, USA, Nov. 12-16, 2018, 8 pages.
Office Action issued in Chinese Application No. 202011372835.1 on Jun. 21, 2021, 9 pages (with English translation).
PCT International Search Report and Written Opinion issued in International Application No. PCT/CN2020/070484 on Apr. 8, 2020, 17 pages (with English translation).

* cited by examiner

PARAMETER CONFIGURATION METHOD AND COMMUNICATIONS APPARATUS

CROSS-REFERENCE TO RELATED APPLICATIONS

This application is a continuation of International Application No. PCT/CN2020/070484, filed on Jan. 6, 2020, which claims priority to Chinese Patent Application No. 201910021166.4, filed on Jan. 9, 2019. The disclosures of the aforementioned applications are hereby incorporated by reference in their entireties.

TECHNICAL FIELD

This application relates to the communications field, and more specifically, to a parameter configuration method and a communications apparatus.

BACKGROUND

In a massive multiple-input multiple-output (Massive MIMO) technology, a network device can reduce interference between a plurality of users and interference between a plurality of signal flows of one user by using a precoding technology. This enhances signal quality, implements spatial multiplexing, and improves spectrum utilization.

For example, a terminal device may determine a precoding vector in a manner such as channel sounding, and expect the network device to obtain, through feedback performed by the terminal device, a precoding vector that is the same as or similar to the precoding vector determined by the terminal device. To reduce feedback overheads and improve feedback precision, in an implementation, the terminal device may indicate a precoding vector to the network device in a feedback manner based on a combination of spatial domain compression and frequency domain compression. Specifically, the terminal device may select one or more spatial domain vectors and one or more frequency domain vectors based on precoding vectors of various frequency domain units at transport layers, to perform, based on a weighted sum of a matrix constructed by using the spatial domain vector and the frequency domain vector, fitting on the precoding vectors corresponding to the frequency domain units at the transport layers.

However, in this implementation, reporting quantities of spatial domain vectors and frequency domain vectors are not defined explicitly.

SUMMARY

This application provides a parameter configuration method and a communications apparatus, to make reporting quantities of spatial domain vectors and frequency domain vectors clear.

According to a first aspect, a parameter configuration method is provided. The method may be performed by a terminal device, or may be performed by a chip configured in the terminal device.

Specifically, the method includes: receiving an indication of a first mapping relationship, where the first mapping relationship is a mapping relationship in a preconfigured first mapping relationship group, the first mapping relationship group includes at least one mapping relationship, and the at least one mapping relationship is used to indicate at least one correspondence between a reporting quantity of spatial domain vectors and a reporting quantity of frequency domain vectors; and determining the reporting quantity $L_0$ of spatial domain vectors and the reporting quantity $M_0$ of frequency domain vectors based on the first mapping relationship, where the $L_0$ spatial domain vectors and the $M_0$ frequency domain vectors are used to construct a precoding vector of one or more frequency domain units, and both $L_0$ and $M_0$ are positive integers.

Therefore, in this embodiment of this application, a plurality of possible correspondences between values of L and values of M are predefined, to narrow down selection ranges of the reporting quantities. This is conducive to reducing a calculation amount for determining the value of L and the value of M by a network device. In addition, a plurality of predefined combinations of the values of L and the values of M can satisfy different feedback precision requirements. Moreover, by narrowing down the selection ranges of the reporting quantities, a quantity of combinations that include the values of L and the values of M and that may be included in the first mapping relationship group can be reduced, and therefore the network device can indicate the first mapping relationship in the first mapping relationship group by using fewer bits. This is conducive to reducing indication overheads of the network device. Furthermore, different feedback precision requirements are taken into account for the plurality of combinations that include the values of L and the values of M and that are defined in this embodiment of this application. When feedback overheads are the same as or approximate to each other, a combination of a value of L and a value of M with better performance is retained as much as possible. In this way, feedback overheads and feedback precision are considered comprehensively, thereby improving performance of a communications system.

With reference to the first aspect, in some implementations of the first aspect, some or all of $L_0 \times M_0$ space-frequency vector pairs constructed by using the $L_0$ spatial domain vectors and the $M_0$ frequency domain vectors are used to construct the precoding vector, where a ratio between a quantity $K_0$ of space-frequency vector pairs used to construct the precoding vector and $2L_0 \times M_0$ is a preset value; $2L_0 \times M_0$ represents a sum of quantities of space-frequency vector pairs constructed in two polarization directions separately by using the $L_0$ spatial domain vectors and the $M_0$ frequency domain vectors; and $K_0$ represents a sum of quantities of space-frequency vector pairs that are in the two polarization directions and that are used to construct the precoding vector.

The ratio between the quantity $K_0$ of space-frequency vector pairs used to construct the precoding vector and $2L_0 \times M_0$ is further limited, that is, a selection range of the quantity of space-frequency vector pairs used to construct the precoding vector is narrowed down. Because a weighting coefficient is corresponding to a space-frequency vector pair, a selection range of a reporting quantity of weighting coefficients is also narrowed down. In addition, some or all of space-frequency vector pairs are selected from the $2L_0 \times M_0$ space-frequency vector pairs to construct the precoding vector, so that some space-frequency vector pairs corresponding to weighting coefficients with relatively small moduli are excluded from the $2L_0 \times M_0$ space-frequency vector pairs. This is conducive to reducing feedback overheads on a premise of ensuring feedback precision.

It should be understood that because $K_0$ is one of a plurality of possible values of K, $L_0$ is one of a plurality of possible values of L, and $M_0$ is one of a plurality of possible values of M, the ratio between $K_0$ and $2L_0 \times M_0$ is a ratio between K and $2L \times M$.

Optionally, the ratio between $K_0$ and $2L_0 \times M_0$ is a fixed value.

For example, the ratio between $K_0$ and $2L_0 \times M_0$ is 1/2. For another example, the ratio between $K_0$ and $2L_0 \times M_0$ is 1/3. For still another example, the ratio between $K_0$ and $2L_0 \times M_0$ is 2/3.

The ratio between $K_0$ and $2L_0 \times M_0$ is directly made to be invariable, without a need to indicate a value of $K_0$ by the network device. The terminal device may directly determine the value of $K_0$ based on the predefined ratio and a value of $L_0$ and a value of $M_0$ that are determined based on the first mapping relationship. In this way, indication overheads of the network device can be reduced.

Optionally, the method further includes: receiving first indication information, where the first indication information is used to indicate the preset value.

As described above, the ratio between $K_0$ and $2L_0 \times M_0$ is a ratio between K and 2L×M. The network device indicates the preset value; to be specific, the ratio between K and 2L×M may be configured to be a plurality of possible values. Therefore, a quantity of combinations of the value of L, the value of M, and the value of K may be increased, and a combination with better performance may be selected from more combinations and may be then retained. Indication overheads caused by indicating the preset value are relatively low. In this way, relatively low indication overheads can be used to obtain more combinations of values of L, values of M, and values of K for selection, to satisfy different feedback precision requirements.

With reference to the first aspect, in some implementations of the first aspect, the method further includes: determining, based on the reporting quantity $L_0$ of spatial domain vectors and the reporting quantity $M_0$ of frequency domain vectors, the quantity $K_0$ of space-frequency vector pairs used to construct the precoding vector, where $K_0 \leq 2L_0 \times M_0$ and $K_0$ is a positive integer; $2L_0 \times M_0$ represents the sum of quantities of space-frequency vector pairs corresponding to the two polarization directions; and $K_0$ represents the sum of quantities of space-frequency vector pairs that are in the two polarization directions and that are used to construct the precoding vector.

The terminal device may determine the value of $K_0$ based on the ratio between $K_0$ and $2L_0 \times M_0$ and the value of $L_0$ and the value of $M_0$ that are determined based on the first mapping relationship.

With reference to the first aspect, in some implementations of the first aspect, the at least one mapping relationship is further used to indicate at least one correspondence among the reporting quantity of spatial domain vectors, the reporting quantity of frequency domain vectors, and a reporting quantity of weighting coefficients.

In other words, the first mapping relationship may directly be used to indicate a correspondence between the value of $L_0$, the value of $M_0$, and the value of $K_0$. The terminal device may directly determine the value of $L_0$, the value of $M_0$, and the value of $K_0$ based on the indication of the first mapping relationship. Therefore, a calculation amount of the terminal device can be reduced.

With reference to the first aspect, in some implementations of the first aspect, the first mapping relationship group is one of a plurality of mapping relationship groups, and the first mapping relationship group is determined based on one of the following: a. a quantity of frequency domain units included in transmission bandwidth of a channel state information-reference signal CSI-RS; b. a quantity of to-be-reported frequency domain units in the transmission bandwidth of the CSI-RS; or c. a quantity of frequency domain units included in bandwidth occupied by the first to-be-reported frequency domain unit to the last to-be-reported frequency domain unit in the transmission bandwidth of the CSI-RS.

In other words, the plurality of mapping relationship groups may be preconfigured, to make the groups correspond to different quantities of frequency domain units. The quantity of frequency domain units herein may be, for example, one of a, b, or c listed above. It can be learnt that a, b, and c listed above are related to the transmission resource of the CSI-RS and/or the quantity of to-be-reported frequency domain units. By using the plurality of mapping relationship groups defined based on this, the quantity of frequency domain vectors reported by the terminal device can increase with an increase of the quantity of to-be-reported frequency domain units or an increase of the quantity of frequency domain units included in the CSI-RS. With same overheads, when there are a relatively large quantity of to-be-reported frequency domain units or there are a relatively large quantity of frequency domain units included in the CSI-RS, increasing the reporting quantity of frequency domain vectors is conducive to improving feedback precision.

According to a second aspect, a parameter configuration method is provided. The method may be performed by a network device, or may be performed by a chip configured in the network device.

Specifically, the method includes: generating an indication of a first mapping relationship, where the first mapping relationship is used to indicate a reporting quantity $L_0$ of space-frequency vectors and a reporting quantity $M_0$ of frequency domain vectors, the $L_0$ spatial domain vectors and the $M_0$ frequency domain vectors are used to construct a precoding vector of one or more frequency domain units, the first mapping relationship is a mapping relationship in a preconfigured first mapping relationship group, the first mapping relationship group includes at least one mapping relationship, the at least one mapping relationship is used to indicate at least one correspondence between the reporting quantity of spatial domain vectors and the reporting quantity of frequency domain vectors, and both $L_0$ and $M_0$ are positive integers; and sending the indication of the first mapping relationship.

Therefore, in this embodiment of this application, a plurality of possible correspondences between values of L and values of M are predefined, to narrow down selection ranges of the reporting quantities. This is conducive to reducing a calculation amount for determining the value of L and the value of M by the network device. In addition, a plurality of predefined combinations of the values of L and the values of M can satisfy different feedback precision requirements. Moreover, by narrowing down the selection ranges of the reporting quantities, a quantity of combinations that include the values of L and the values of M and that may be included in the first mapping relationship group can be reduced, and therefore the network device can indicate the first mapping relationship in the first mapping relationship group by using fewer bits. This is conducive to reducing indication overheads of the network device. Furthermore, different feedback precision requirements are taken into account for the plurality of combinations that include the values of L and the values of M and that are defined in this embodiment of this application. When feedback overheads are the same as or approximate to each other, a combination of a value of L and a value of M with better performance is retained as much as possible. In this way, feedback overheads and feedback precision are considered comprehensively, thereby improving performance of a communications system.

With reference to the second aspect, in some implementations of the second aspect, some or all of $L_0 \times M_0$ space-frequency vector pairs constructed by using the $L_0$ spatial domain vectors and the $M_0$ frequency domain vectors are used to construct the precoding vector, where a ratio between a quantity $K_0$ of space-frequency vector pairs used to construct the precoding vector and $2L_0 \times M_0$ is a preset value; $2L_0 \times M_0$ represents a sum of quantities of space-frequency vector pairs constructed in two polarization directions separately by using the $L_0$ spatial domain vectors and the $M_0$ frequency domain vectors; and $K_0$ represents a sum of quantities of space-frequency vector pairs that are in the two polarization directions and that are used to construct the precoding vector.

The ratio between the quantity $K_0$ of space-frequency vector pairs used to construct the precoding vector and $2L_0 \times M_0$ is further limited, that is, a selection range of the quantity of space-frequency vector pairs used to construct the precoding vector is narrowed down. Because a weighting coefficient is corresponding to a space-frequency vector pair, a selection range of a reporting quantity of weighting coefficients is also narrowed down. In addition, some or all of space-frequency vector pairs are selected from the $2L_0 \times M_0$ space-frequency vector pairs to construct the precoding vector, so that some space-frequency vector pairs corresponding to weighting coefficients with relatively small moduli are excluded from the $2L_0 \times M_0$ space-frequency vector pairs. This is conducive to reducing feedback overheads on a premise of ensuring feedback precision.

It should be understood that because $K_0$ is one of a plurality of possible values of K, $L_0$ is one of a plurality of possible values of L, and $M_0$ is one of a plurality of possible values of M, the ratio between $K_0$ and $2L_0 \times M_0$ is a ratio between K and $2L \times M$.

Optionally, the ratio between $K_0$ and $2L_0 \times M_0$ is a fixed value.

For example, the ratio between $K_0$ and $2L_0 \times M_0$ is 1/2. For another example, the ratio between $K_0$ and $2L_0 \times M_0$ is 1/3. For still another example, the ratio between $K_0$ and $2L_0 \times M_0$ is 2/3.

The ratio between $K_0$ and $2L_0 \times M_0$ is directly made to be invariable, without a need to indicate a value of $K_0$ by the network device. A terminal device may directly determine the value of $K_0$ based on the predefined ratio and a value of $L_0$ and a value of $M_0$ that are determined based on the first mapping relationship. In this way, indication overheads of the network device can be reduced.

Optionally, the method further includes: sending first indication information, where the first indication information is used to indicate the preset value.

As described above, the ratio between $K_0$ and $2L_0 \times M_0$ is a ratio between K and $2L \times M$. The network device indicates the preset value; to be specific, the ratio between K and $2L \times M$ may be configured to be a plurality of possible values. Therefore, a quantity of combinations of the value of L, the value of M, and the value of K may be increased, and a combination with better performance may be selected from more combinations and may be then retained. Indication overheads caused by indicating the preset value are relatively low. In this way, relatively low indication overheads can be used to obtain more combinations of values of L, values of M, and values of K for selection, to satisfy different feedback precision requirements.

With reference to the second aspect, in some implementations of the second aspect, the at least one mapping relationship is further used to indicate at least one correspondence among the reporting quantity of spatial domain vectors, the reporting quantity of frequency domain vectors, and a reporting quantity of weighting coefficients.

In other words, the first mapping relationship may directly be used to indicate a correspondence between the value of $L_0$, the value of $M_0$, and the value of $K_0$. The terminal device may directly determine the value of $L_0$, the value of $M_0$, and the value of $K_0$ based on the indication of the first mapping relationship. Therefore, a calculation amount of the terminal device can be reduced.

With reference to the second aspect, in some implementations of the second aspect, the first mapping relationship group is one of a plurality of mapping relationship groups, and the first mapping relationship group is determined based on one of the following: a. a quantity of frequency domain units included in transmission bandwidth of a channel state information-reference signal CSI-RS; b. a quantity of to-be-reported frequency domain units in the transmission bandwidth of the CSI-RS; or c. a quantity of frequency domain units included in bandwidth occupied by the first to-be-reported frequency domain unit to the last to-be-reported frequency domain unit in the transmission bandwidth of the CSI-RS.

In other words, the plurality of mapping relationship groups may be preconfigured, to make the groups correspond to different quantities of frequency domain units. The quantity of frequency domain units herein may be, for example, one of a, b, or c listed above. It can be learnt that a, b, and c listed above are related to the transmission resource of the CSI-RS and/or the quantity of to-be-reported frequency domain units. By using the plurality of mapping relationship groups defined based on this, the quantity of frequency domain vectors reported by the terminal device can increase with an increase of the quantity of to-be-reported frequency domain units or an increase of the quantity of frequency domain units included in the CSI-RS. With same overheads, when there are a relatively large quantity of to-be-reported frequency domain units or there are a relatively large quantity of frequency domain units included in the CSI-RS, increasing the reporting quantity of frequency domain vectors is conducive to improving feedback precision.

According to a third aspect, a communications apparatus is provided, including various modules or units configured to perform the method in any one of the first aspect or the possible implementations of the first aspect.

According to a fourth aspect, a communications apparatus is provided, including a processor. The processor is coupled to a memory, and may be configured to execute an instruction in the memory to perform the method in any one of the first aspect or the possible implementations of the first aspect. Optionally, the communications apparatus further includes the memory. Optionally, the communications apparatus further includes a communications interface, and the processor is coupled to the communications interface.

In an implementation, the communications apparatus is a terminal device. When the communications apparatus is a terminal device, the communications interface may be a transceiver or an input/output interface.

In another implementation, the communications apparatus is a chip configured in the terminal device. When the communications apparatus is a chip configured in the terminal device, the communications interface may be an input/output interface.

Optionally, the transceiver may be a transceiver circuit. Optionally, the input/output interface may be an input/output circuit.

According to a fifth aspect, a communications apparatus is provided, including various modules or units configured to perform the method in any one of the second aspect or the possible implementations of the second aspect.

According to a sixth aspect, a communications apparatus is provided, including a processor. The processor is coupled to a memory, and may be configured to execute an instruction in the memory to perform the method in any one of the second aspect or the possible implementations of the second aspect. Optionally, the communications apparatus further includes the memory. Optionally, the communications apparatus further includes a communications interface, and the processor is coupled to the communications interface.

In an implementation, the communications apparatus is a network device. When the communications apparatus is a network device, the communications interface may be a transceiver or an input/output interface.

In another implementation, the communications apparatus is a chip configured in the network device. When the communications apparatus is a chip configured in the network device, the communications interface may be an input/output interface.

Optionally, the transceiver may be a transceiver circuit. Optionally, the input/output interface may be an input/output circuit.

According to a seventh aspect, a processor is provided, including an input circuit, an output circuit, and a processing circuit. The processing circuit is configured to receive a signal by using the input circuit and transmit a signal by using the output circuit, so that the processor performs the method in any one of the first aspect or the possible implementations of the first aspect and the method in any one of the second aspect or the possible implementations of the second aspect.

In a specific implementation process, the processor may be a chip, the input circuit may be an input pin, the output circuit may be an output pin, and the processing circuit may be a transistor, a gate circuit, a trigger, a logic circuit, or the like. The input signal received by using the input circuit may be, for example, but not limited to, received and input by a receiver. The signal output by using the output circuit may be, for example, but not limited to, output to a transmitter and transmitted by the transmitter. The input circuit and the output circuit may be a same circuit, and the circuit serves as an input circuit and an output circuit at different moments. Specific implementations of the processor and the circuits are not limited in this embodiment of this application.

According to an eighth aspect, a processing apparatus is provided, including a processor and a memory. The processor is configured to: read an instruction stored in the memory, receive a signal by using a receiver, and transmit a signal by using a transmitter, to perform the method in any one of the first aspect or the possible implementations of the first aspect and the method in any one of the second aspect or the possible implementations of the second aspect.

Optionally, there are one or more processors, and there are one or more memories.

Optionally, the memory may be integrated with the processor, or the memory and the processor are disposed separately.

In a specific implementation process, the memory may be a non-transitory memory such as a read-only memory (ROM). The memory and the processor may be integrated into one chip, or may be disposed in different chips. A type of the memory and a manner in which the memory and the processor are disposed are not limited in this embodiment of this application.

It should be understood that a related data exchange process such as sending of indication information may be a process in which the indication information is output from the processor, and receiving of capability information may be a process in which the processor receives the input capability information. Specifically, data output by the processor may be output to the transmitter, and input data received by the processor may come from the receiver. The transmitter and the receiver may be collectively referred to as a transceiver.

The processing apparatus in the eighth aspect may be one or more chips. The processor may be implemented by using hardware or software. When the processor is implemented by using hardware, the processor may be a logic circuit, an integrated circuit, or the like. When the processor is implemented by using software, the processor may be a general purpose processor, and is implemented by reading software code stored in the memory. The memory may be integrated with the processor, or may be located independent of the processor.

According to a ninth aspect, a computer program product is provided. The computer program product includes a computer program (which may also be referred to as code or an instruction). When the computer program is run, a computer is enabled to perform the method in any one of the first aspect or the possible implementations of the first aspect and the method in any one of the second aspect or the possible implementations of the second aspect.

According to a tenth aspect, a computer-readable medium is provided. The computer-readable medium stores a computer program (which may also be referred to as code or an instruction). When the computer program is run on a computer, the computer is enabled to perform the method in any one of the first aspect or the possible implementations of the first aspect and the method in any one of the second aspect or the possible implementations of the second aspect.

According to an eleventh aspect, a communications system is provided, including the foregoing network device and terminal device.

DESCRIPTION OF EMBODIMENTS

The following describes technical solutions of this application with reference to the accompanying drawings.

The technical solutions of embodiments of this application may be applied to various communications systems, such as: a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS) system, a worldwide interoperability for microwave access (WiMAX) communications system, a future 5th generation (5G) system or new radio (NR) system.

Figure 1:
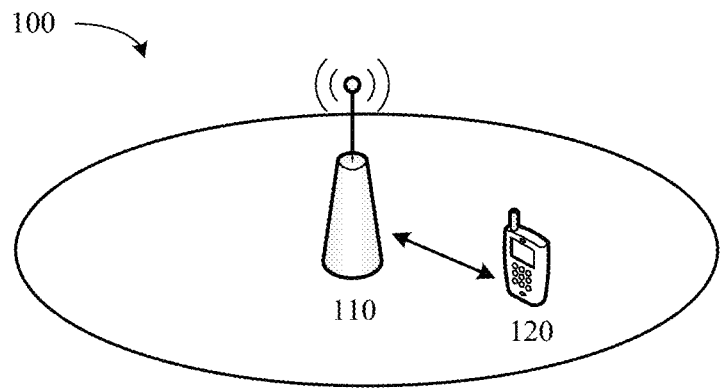
FIG. 1 is a schematic diagram of a communications system to which a parameter configuration method provided in an embodiment of this application is applicable.

For ease of understanding the embodiments of this application, a communications system shown in FIG. 1 is first used as an example for detailing the communications systems to which the embodiments of this application are applicable. FIG. 1 is a schematic diagram of a communications system 100 to which a vector indication method that is used for constructing a precoding vector and that is provided in an embodiment of this application is applicable. As shown in FIG. 1, the communications system 100 may include at least one network device, for example, a network device 110 shown in FIG. 1. The communications system 100 may further include at least one terminal device, for example, a terminal device 120 shown in FIG. 1. The network device 110 may communicate with the terminal device 120 through a radio link. A plurality of antennas may be configured for each communications device, such as the network device 110 or the terminal device 120. For each communications device in the communications system 100, a plurality of configured antennas may include at least one transmit antenna for signal sending and at least one receive antenna for signal receiving. Therefore, various communications devices in the communications system 100, such as the network device 110 and the terminal device 120, may communicate with each other by using a multiple-antenna technology.

It should be understood that the network device in the communications system 100 may be any device having a wireless receiving/sending function. The network device includes but is not limited to an evolved NodeB (eNB), a radio network controller (radio network controller, RNC), a NodeB (NB), a base station controller (BSC), a base transceiver station (BTS), a home NodeB (for example, home evolved NodeB or home Node B, HNB), or a baseband unit (BBU); an access point (AP), a wireless relay node, a wireless backhaul node, a transmission point (TP), or a transmission and reception point (TRP) in a wireless fidelity (WiFi) system; a gNB or a transmission point (a TRP or a TP) in a 5G system such as an NR system; one antenna panel or a group of antenna panels (including a plurality of antenna panels) of a base station in the 5G system; or a network node, such as a baseband unit (BBU) or a distributed unit (DU), that forms a gNB or a transmission point.

In some deployments, the gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, while the DU implements functions of a radio link control (RLC) layer, a media access control (MAC) layer, and a physical (PHY) layer. Information at the RRC layer finally becomes information at the PHY layer or is transformed from information at the PHY layer. Therefore, in such an architecture, it may be considered that higher layer signaling such as RRC layer signaling is sent by the DU or is sent by the DU and the CU. It can be understood that the network device may be a CU node, a DU node, or a device including a CU node and a DU node. In addition, the CU may be classified as a network device in an access network (RAN), or the CU may be classified as a network device in a core network (CN). This is not limited in this application.

It should further be understood that the terminal device in the wireless communications system may also be referred to as user equipment (UE), an access terminal, a user unit, a user station, a mobile station, a mobile station, a remote station, a remote terminal, a mobile device, a user terminal, a terminal, a wireless communication device, a user agent, or a user apparatus. The terminal device in this embodiment of this application may be a mobile phone, a tablet computer (pad), a computer having a wireless receiving/sending function, a virtual reality (VR) terminal device, an augmented reality (AR) terminal device, a wireless terminal in industrial control, a wireless terminal in self-driving, a wireless terminal in a remote medical application, a wireless terminal in a smart grid, a wireless terminal in transportation safety, a wireless terminal in a smart city, a wireless terminal in a smart home, or the like. No application scenario is limited in this embodiment of this application.

It should also be understood that FIG. 1 is an example simplified schematic diagram merely for ease of understanding, and the communications system 100 may further include another network device or another terminal device, which is not drawn in FIG. 1.

For ease of understanding the embodiments of this application, the following briefly describes a process in which a downlink signal is processed at a physical layer before being sent. It should be understood that the processing process of the downlink signal described below may be performed by the network device, or may be performed by a chip configured in the network device. For ease of description, the network device and the chip configured in the network device are collectively referred to as network devices below.

The network device may process a code word on a physical channel. The code word may be an encoded bit obtained through encoding (for example, including channel coding). Scrambling is performed on the code word to generate a scrambled bit. Modulation mapping is performed on the scrambled bit to obtain a modulated symbol. Through layer mapping, the modulated symbol is mapped onto a plurality of layers, which are alternatively referred to as transport layers. Precoding is performed on the modulated symbol obtained after the layer mapping, to obtain a precoded signal. After resource element (RE) mapping is performed on the precoded signal, the precoded signal is mapped onto a plurality of REs. After orthogonal frequency division multiplexing (OFDM) modulation is performed on these REs, REs obtained through OFDM modulation are transmitted through an antenna port.

It should be understood that the processing process of the downlink signal described above is merely used as an example for description, and should not constitute any limitation on this application. For details about the processing process of the downlink signal, refer to the conventional technology. For brevity, detailed descriptions of the specific process thereof are omitted herein.

For ease of understanding the embodiments of this application, the following first describes terms in the embodiments of this application briefly.

1. Precoding technology: A sending device (such as the network device) may process, when a channel state is known, a to-be-sent signal by using a precoding matrix matching a channel resource, so that a to-be-sent signal obtained through precoding adapts to a channel. This reduces complexity of eliminating inter-channel impact by a receiving device (such as the terminal device). Therefore, received signal quality (for example, a signal to interference plus noise ratio (SINR)) is enhanced by performing precoding processing on the to-be-sent signal. In this way, by using the precoding technology, the sending device and a plurality of receiving devices can perform transmission on a same time-frequency resource; in other words, multi-user multiple-input multiple-output (MU-MIMO) is implemented.

It should be understood that related descriptions of the precoding technology are examples merely for ease of understanding, and are not used to limit the protection scope of the embodiments of this application. In a specific implementation process, the sending device may alternatively perform precoding in another manner. For example, when channel information (for example, but not limited to, a channel matrix) cannot be learnt, a preset precoding matrix or a weighted processing manner is used for precoding. For brevity, specific content thereof is not described in this specification.

2. Precoding matrix and precoding matrix indicator (PMI): The PMI may be used to indicate the precoding matrix. The precoding matrix may be, for example, a precoding matrix that is corresponding to each frequency domain unit and that is determined by the terminal device based on a channel matrix of the frequency domain unit (such as a subband).

The channel matrix may be determined by the terminal device in a manner such as channel estimation or based on channel reciprocity. However, it should be understood that a specific method for determining the channel matrix by the terminal device is not limited to the foregoing description. For a specific implementation, refer to the conventional technology. For brevity, details are not described herein.

The precoding matrix may be obtained by performing singular value decomposition (SVD) on the channel matrix or a covariance matrix of the channel matrix, or may be obtained by performing eigenvalue decomposition (EVD) on a covariance matrix of the channel matrix.

It should be understood that the manners of determining the precoding matrix described above are merely examples, and should not constitute any limitation on this application. For the manner of determining the precoding matrix, refer to the conventional technology. For brevity, details are not described herein.

It should be noted that in the embodiments of this application, a precoding matrix corresponding to a frequency domain unit may be a precoding matrix that is fed back specific to the frequency domain unit, for example, may be a precoding matrix that is fed back after channel sounding is performed based on a reference signal on the frequency domain unit. The precoding matrix corresponding to the frequency domain unit may be a precoding matrix used to precode data that is subsequently transmitted by using the frequency domain unit. In the following, a precoding matrix corresponding to a frequency domain unit may also be referred to as the precoding matrix of the frequency domain unit, and a precoding vector corresponding to a frequency domain unit may also be referred to as the precoding vector of the frequency domain unit.

It should also be noted that in the embodiments of this application, a precoding matrix that is determined by the network device based on a feedback of the terminal device may directly be used for downlink data transmission; or some beamforming methods, for example, zero forcing (ZF), regularized zero-forcing (RZF), a minimum mean square error (MMSE) algorithm, and signal-to-leakage-and-noise ratio (SLNR) maximization, are performed to obtain a final precoding matrix used for downlink data transmission. This is not limited in this application. Unless otherwise specified, each precoding matrix (or vector) in the following may be the precoding matrix (or vector) that is determined by the network device based on the feedback of the terminal device.

3. Precoding vector: One precoding matrix may include one or more vectors, for example, a column vector. One precoding matrix may be used to determine one or more precoding vectors.

When there is one transport layer and there is also one polarization direction for a transmit antenna, the precoding vector may be a precoding matrix. When there are a plurality of transport layers and there is one polarization direction for a transmit antenna, the precoding vector may be a component of a precoding matrix at one transport layer. When there is one transport layer and there are a plurality of polarization directions for a transmit antenna, the precoding vector may be a component of a precoding matrix in one polarization direction. When there are a plurality of transport layers and there are also a plurality of polarization directions for a transmit antenna, the precoding vector may be a component of a precoding matrix at one transport layer and in one polarization direction.

It should be understood that the precoding vector may alternatively be determined based on a vector in the precoding matrix. For example, the precoding vector is obtained by performing mathematical transformation on the vector in the precoding matrix. A mathematical transformation relationship between the precoding matrix and the precoding vector is not limited in this application.

4. Transmission bandwidth of a channel state information-reference signal (CSI-RS): In the embodiments of this application, the transmission bandwidth of the CSI-RS may be bandwidth occupied in frequency domain by a resource for transmitting the CSI-RS. The terminal device may receive the CSI-RS by using the transmission bandwidth of the CSI-RS, to perform channel sounding and reporting. In other words, the transmission bandwidth of the CSI-RS may be a width of a frequency band occupied by the CSI-RS based on which the terminal device performs reporting.

In an implementation, the transmission bandwidth of the CSI-RS may be frequency-domain occupation bandwidth of a CSI-RS resource. The frequency-domain occupation bandwidth of the CSI-RS resource may be configured by using information element (IE) CSI frequency-domain occupation bandwidth (CSI-Frequency Occupation).

The network device may further indicate a quantity of to-be-reported subbands and a location of the to-be-reported subband (that is, an example of a frequency domain unit) by using a reporting bandwidth (csi-ReportingBand) field in an IE CSI report configuration (CSI-ReportConfig). The field may be a bitmap. A length of the bitmap may be equal to a quantity of subbands included in the frequency-domain occupation bandwidth of the CSI-RS-Resource. Each indicator bit in the bitmap may be corresponding to one subband in the frequency-domain occupation bandwidth of the CSI-RS-Resource. Each indicator bit is used to indicate whether CSI of a corresponding subband needs to be reported. For example, when an indicator bit is set to "1", CSI of a corresponding subband needs to be reported; when an indicator bit is set to "0", CSI of a corresponding subband does not need to be reported. It should be understood that meanings expressed by values of the indicator bit that are listed herein are merely examples, and should not constitute any limitation on this application.

It should also be understood that the foregoing signaling used for indicating the frequency-domain occupation bandwidth of the CSI measurement resource and the foregoing signaling used for indicating the to-be-reported subband are merely examples, and should not constitute any limitation on this application. None of the signaling used for indicating the frequency-domain occupation bandwidth of the CSI measurement resource, the signaling used for indicating the to-be-reported subband, and specific indication manners are limited in this application.

In another implementation, the transmission bandwidth of the CSI-RS may be bandwidth corresponding to csi-ReportingBand. A quantity of subbands included in the transmission bandwidth of the CSI-RS may be a quantity of bits included in csi-ReportingBand, or in other words, the quantity of subbands included in the transmission bandwidth of the CSI-RS may be a length of csi-ReportingBand.

5. An antenna port is referred to as a port for short, and can be understood as a virtual antenna identified by a receiving device or a transmit antenna that is spatially distinguishable. One antenna port may be configured for each virtual antenna, each virtual antenna may be a weighted combination of a plurality of physical antennas, and each antenna port may be corresponding to one reference signal. Therefore, each antenna port may be referred to as a port of one reference signal. In the embodiments of this application, the antenna port may be an actual independent sending unit (TxRU).

6. A spatial domain vector is alternatively referred to as a beam vector. Each element in the spatial domain vector may represent a weight of each antenna port. Based on the weight of each antenna port represented by each element in the spatial domain vector, linear superposition is performed on signals of the antenna ports, so that an area with relatively strong signals can be formed in a specific direction spatially.

For ease of description, it is assumed that a spatial domain vector is denoted as u in the following description. A length of the spatial domain vector u may be equal to a quantity $N_s$ of transmit antenna ports in a polarization direction, where $N_s$ is greater than or equal to 1 and is an integer. The spatial domain vector may be, for example, a column vector or a row vector whose length is $N_s$. This is not limited in this application.

For a definition of the spatial domain vector, refer to a two-dimensional (2D)-discrete Fourier transform (DFT) vector or an over-sampling 2D-DFT vector defined in a type-II codebook in the NR protocol TS 38.214 release 15 (R15). For brevity, details are not described herein.

7. A spatial domain vector set may include a plurality of spatial domain vectors with different lengths that are corresponding to different quantities of transmit antenna ports. In the embodiments of this application, because the length of the spatial domain vector is $N_s$, lengths of all spatial domain vectors in a spatial domain vector set to which the spatial domain vector reported by the terminal device belongs are $N_s$.

In a possible design, the spatial domain vector set may include $N_s$ spatial domain vectors, where every two of the $N_s$ spatial domain vectors may be orthogonal to each other. Each spatial domain vector in the spatial domain vector set may be taken from a 2D-DFT matrix. 2D may represent two different directions such as a horizontal direction and a vertical direction.

The $N_s$ spatial domain vectors may be denoted, for example, as $u_1, u_2, \ldots,$ and $u_{N_s}$. The $N_s$ spatial domain vectors may be used to construct a matrix $B_s$, where $B_s \triangleq [u_1 \; u_2 \ldots u_{N_s}]$.

In another possible design, the spatial domain vector set may be extended as $O_s \times N_s$ spatial domain vectors by using an over-sampling factor $O_s$. In this case, the spatial domain vector set may include $O_s$ subsets, and each subset may include $N_s$ spatial domain vectors. Every two of the $N_s$ spatial domain vectors in each subset may be orthogonal to each other. Each spatial domain vector in the spatial domain vector set may be taken from an over-sampling 2D-DFT matrix. The over-sampling factor $O_s$ is a positive integer. Specifically, $O_s = O_1 \times O_2$, where $O_1$ may be an over-sampling factor in a horizontal direction, and $O_2$ may be an over-sampling factor in a vertical direction; $O_1 \geq 1$, and $O_2 \geq 1$; and at least one of $O_1$ and $O_2$ is not 1 at the same time, and both $O_1$ and $O_2$ are integers.

$N_s$ spatial domain vectors in an $o_s^{th}$ subset ($1 \leq o_s \leq O_s$ and $o_s$ is an integer) in the spatial domain vector set may be denoted, for example, as $u_1^{o_s}, u_2^{o_s}, \ldots,$ and $u_{N_s}^{o_s}$. In this case, a matrix $B_s^{o_s}$ may be constructed based on the $N_s$ spatial domain vectors in the $o_s^{th}$ subset, where $B_s^{o_s} \triangleq [u_1^{o_s} \; u_2^{o_s} \ldots u_{N_s}^{o_s}]$.

Therefore, each spatial domain vector in the spatial domain vector set may be taken from the 2D-DFT matrix or the over-sampling 2D-DFT matrix. Each column vector in the spatial domain vector set may be referred to as a 2D-DFT vector or an over-sampling 2D-DFT vector. In other words, the spatial domain vector may be a 2D-DFT vector or an over-sampling 2D-DFT vector.

8. A frequency domain vector is a vector that is proposed in the embodiments of this application to indicate a change law of a channel in frequency domain. Each frequency domain vector may indicate a change law. When a signal is transmitted on a wireless channel, the signal may be transmitted from a transmit antenna to a receive antenna after going through a plurality of paths. A multipath delay results in frequency selective fading, that is, a change of a frequency domain channel. Therefore, different frequency domain vectors may be used to indicate change laws of a channel in frequency domain caused by delays on different transmission paths.

For ease of description, it is assumed that a frequency domain vector is denoted as v in the following description. A length of the frequency domain vector may be denoted as $N_f$, where $N_f$ is greater than or equal to 1 and is an integer.

9. A frequency domain vector set may include a plurality of frequency domain vectors with different lengths. One or more frequency domain vectors in the frequency domain vector set are selected for constructing a precoding vector.

In a possible design, the frequency domain vector set may include a plurality of frequency domain vectors. Every two of the plurality of frequency domain vectors may be orthogonal to each other. Each frequency domain vector in the frequency domain vector set may be taken from a DFT matrix.

The $N_f$ frequency domain vectors may be denoted, for example, as $v_1, v_2, \ldots,$ and $v_{N_f}$. The $N_f$ frequency domain vectors may be used to construct a matrix $B_f$, where $B_f \triangleq [v_1 \; v_2 \ldots v_{N_f}]$.

In another possible design, the frequency domain vector set may be extended as $O_f \times N_f$ frequency domain vectors by using an over-sampling factor $O_f$. In this case, the frequency domain vector set may include $O_f$ subsets, and each subset may include $N_f$ frequency domain vectors. Every two of the $N_f$ frequency domain vectors in each subset may be orthogonal to each other. Each subset may be referred to as an orthogonal group. Each frequency domain vector in the frequency domain vector set may be taken from an over-sampling DFT matrix. The over-sampling factor $O_f$ is a positive integer.

$N_f$ frequency domain vectors in an $o_f^{th}$ subset ($1 \leq o_f \leq O_f$ and $O_f$ is an integer) in the frequency domain vector set may be denoted, for example, as $v_1^{o_f}, v_2^{o_f}, \ldots,$ and $v_{N_f}^{o_f}$. In this case, a matrix $B_f^{o_f}$ may be constructed based on the $N_f$ frequency domain vectors in the $o_f^{th}$ subset, where $B_f^{o_f} \triangleq [v_1^{o_f} \, v_2^{o_f} \, \ldots \, v_{N_f}^{o_f}]$.

Therefore, each frequency domain vector in the frequency domain vector set may be taken from the DFT matrix or the over-sampling DFT matrix. Each column vector in the frequency domain vector set may be referred to as a DFT vector or an over-sampling DFT vector. In other words, the frequency domain vector may be a DFT vector or an over-sampling DFT vector.

10. Space-frequency component matrix: A space-frequency component matrix may be determined by using one spatial domain vector and one frequency domain vector. A space-frequency component matrix may be determined, for example, by using one spatial domain vector and a conjugate transpose of one frequency domain vector: $u \times v^H$, and dimensions of the space-frequency component matrix may be $N_s \times N_f$.

It should be understood that the space-frequency component matrix may be a representation form of a basic space-frequency unit determined by using one spatial domain vector and one frequency domain vector. The basic space-frequency unit may alternatively be represented, for example, as a space-frequency component vector. The space-frequency component vector may be determined, for example, a Kronecker product of one spatial domain vector and one frequency domain vector. The basic space-frequency unit may alternatively be represented, for example, as a space-frequency vector pair. A specific representation form of the basic space-frequency unit is not limited in this application. Based on a same concept, various possible forms that are determined by a person skilled in the art by using one spatial domain vector and one frequency domain vector shall fall within the protection scope of this application. In addition, if the spatial domain vector or the frequency domain vector is defined in a form different from that described above, a computational relationship between the space-frequency component matrix, the spatial domain vector, and the frequency domain vector may also vary. The computational relationship between the space-frequency component matrix, the spatial domain vector, and the frequency domain vector is not limited in this application.

11. Space-frequency matrix: The space-frequency matrix can be understood as an intermediate quantity used for determining a precoding matrix in the embodiments of this application. For the terminal device, the space-frequency matrix may be determined by using the precoding matrix or a channel matrix. For the network device, the space-frequency matrix may be obtained based on a weighted sum of a plurality of space-frequency component matrices, and is used for restoring a downlink channel or the precoding matrix.

As described above, the space-frequency component matrix may be represented as a matrix whose dimensions are $N_s \times N_f$, and the space-frequency matrix may also be represented as a matrix whose dimensions are $N_s \times N_f$. The space-frequency matrix whose dimensions are $N_s \times N_f$ may include $N_f$ column vectors whose lengths are all $N_s$. The $N_f$ column vectors may be corresponding to $N_f$ frequency domain units, and each column vector may be used to determine a precoding vector of a corresponding frequency domain unit.

For example, the space-frequency matrix may be denoted as H, where $H = [w_1 \, w_2 \, \ldots \, w_{N_f}]$. $w_1$ to $w_{N_f}$ are the $N_f$ column vectors corresponding to the $N_f$ frequency domain units, where a length of each column vector may be $N_s$. The $N_f$ column vectors may respectively be used to determine precoding vectors of the $N_f$ frequency domain units.

It should be understood that the space-frequency matrix is merely a representation form of an intermediate quantity used for determining a precoding matrix, and should not constitute any limitation on this application. For example, the column vectors in the space-frequency matrix are successively arranged end to end from left to right, or are arranged according to another predefined rule, to obtain a vector whose length is $N_s \times N_f$. The vector may be referred to as a space-frequency vector.

It should also be understood that the foregoing dimensions of the space-frequency matrix and the space-frequency vector are merely examples, and should not constitute any limitation on this application. For example, the space-frequency matrix may alternatively be a matrix whose dimensions are $N_f \times N_s$. Each row vector may be corresponding to one frequency domain unit, and may be used to determine a precoding vector of the corresponding frequency domain unit.

In addition, when a plurality of polarization directions are configured for a transmit antenna, the dimensions of the space-frequency matrix may further be increased. For example, for a dual-polarization directional antenna, the dimensions of the space-frequency matrix may be $2N_s \times N_f$ or $N_f \times 2N_s$. It should be understood that a quantity of polarization directions for the transmit antenna is not limited in this application.

12. Feedback overheads are overheads that are caused when the terminal device feeds back, to the network device, indication information that is of a selected spatial domain vector, a selected frequency domain vector, and a corresponding weighting coefficient.

In an implementation, the terminal device may indicate the selected spatial domain vector by indicating an index of a selected spatial domain vector combination in the spatial domain vector set. Overheads incurred may be, for example, $\lceil \log_2 C_{N_s}^L \rceil$ bits. If the spatial domain vector set is extended as a plurality of subsets by using an over-sampling factor, overheads incurred may be, for example, $\lceil \log_2 O_s \rceil$ bits.

The terminal device may indicate the selected frequency domain vector by indicating an index of a selected frequency domain vector combination in the frequency domain vector set. Overheads incurred may be, for example, $\lceil \log_2 C_{N_f}^M \rceil$ bits. If the spatial domain vector set is extended as a plurality of subsets by using an over-sampling factor, overheads incurred may be, for example, $\lceil \log_2 O_f \rceil$ bits.

The terminal device may indicate, by using a bitmap, locations of space-frequency vector pairs corresponding to K weighting coefficients in $L \times M$ space-frequency vector pairs constructed by using L spatial domain vectors and M frequency domain vectors. A length of the bitmap may be, for example, $L \times M$ bits.

If a quantity of polarization directions for the transmit antenna is further considered, the K weighting coefficients may be corresponding to some or all of $2L \times M$ space-frequency vector pairs in two polarization directions. If one or more same space-frequency vector pairs, for example, K/2 space-frequency vector pairs, are shared for the two polarization directions, the length of the bitmap may still be L×M bits. If respective space-frequency vector pairs are used for the two polarization directions, for example, $K_1$ space-frequency vector pairs in the L×M space-frequency vector pairs are used for a first polarization direction and $K_2$ space-frequency vector pairs in the L×M space-frequency vector pairs are used for a second polarization direction, where $K=K_1+K_2$, the length of the bitmap may be 2L×M bits.

It should be understood that in the embodiments of this application, for ease of description, when quantities of polarization directions for the transmit antenna are different, the quantity K of weighting coefficients always represents a total quantity of weighting coefficients fed back by the terminal device. Therefore, when there are two polarization directions for the transmit antenna, K is at least an integer greater than or equal to 2. If one or more same space-frequency vector pairs are shared for the two polarization directions, K is an even number. However, in this application, it is possible that a reporting quantity of weighting coefficients is defined based on each polarization direction for the transmit antenna in a future protocol. For example, when there are two polarization directions for the transmit antenna, a reporting quantity of weighting coefficients for each polarization direction may be K', where K' is a positive integer. In this case, a total reporting quantity of weighting coefficients for the two polarization directions is 2K'. K' is merely defined to distinguish K' from K. If one or more same space-frequency vector pairs are shared for the two polarization directions, K' may be equal to K/2.

The terminal device may indicate the K weighting coefficients in a normalization manner, and then the terminal device may indicate a location of a normalization coefficient by using $\lceil \log_2 K \rceil$ bits. It can be understood that, when the parameter K is not configured, the terminal device may indicate the location of the normalization coefficient by using $\lceil \log_2(L \times M) \rceil$ bits (which are corresponding to one polarization direction) or $\lceil \log_2(2L \times M) \rceil$ bits (which are corresponding to two polarization directions).

The terminal device may further quantize remaining (K−1) weighting coefficients by using (A+P) (K−1) bits, where A represents a quantity of quantization bits of an amplitude of each weighting coefficient, P represents a quantity of quantization bits of a phase of each weighting coefficient, and both A and P are positive integers.

In summary, when there are two polarization directions for the transmit antenna, and the same L spatial domain vectors, M frequency domain vectors, and L×M space-frequency vector pairs are shared for the two polarization directions, the feedback overheads may be, for example, $(\lceil \log_2 O_s \rceil + \lceil \log_2 C_{N_s}^L \rceil + \lceil \log_2 O_f \rceil + \lceil \log_2 C_{N_f}^M \rceil + \lceil \log_2 K \rceil + 2L \times M + (A+P)(K-1))$ bits or $(\lceil \log_2 O_s \rceil + \lceil \log_2 C_{N_s}^L \rceil + \lceil \log_2 O_f \rceil + \lceil \log_2 C_{N_f}^M \rceil + \lceil \log_2 K \rceil + L \times M + (A+P)(K-1))$ bits.

It can be learnt from the foregoing feedback overheads that, as the reporting quantities of spatial domain vectors, frequency domain vectors, and weighting coefficients increase, the feedback overheads are also increasing.

It should be understood that, merely for ease of understanding, the foregoing describes a possible example of indication overheads resulting from feeding back the spatial domain vectors, the frequency domain vectors, and the weighting coefficients by the terminal device. However, this should not constitute any limitation on this application. A specific manner of feeding back the spatial domain vectors, the frequency domain vectors, and the weighting coefficients by the terminal device and the feedback overheads are not limited in this application. For example, the terminal device may separately indicate an index of each selected spatial domain vector in the spatial domain vector set and an index of each selected frequency domain vector in the frequency domain vector set. For another example, the terminal device may indicate the weighting coefficient in each polarization direction in the normalization manner, and therefore a location of one normalization coefficient may be indicated in each polarization direction.

13. Dual-domain compression includes spatial domain compression and frequency domain compression. The spatial domain compression may mean that one or more spatial domain vectors are selected from the spatial domain vector set, as a spatial domain vector used to construct a precoding vector. The frequency domain compression may mean that one or more frequency domain vectors are selected from the frequency domain vector set, as a frequency domain vector used to construct the precoding vector. The selected spatial domain vector is some or all of spatial domain vectors in the spatial domain vector set, and the selected frequency domain vector is some or all of frequency domain vectors in the frequency domain vector set.

A matrix determined by using one spatial domain vector and one frequency domain vector may be, for example, the foregoing space-frequency component matrix. The one or more selected spatial domain vectors and the one or more selected frequency domain vectors may be used to determine one or more space-frequency component matrices. A weighted sum of the one or more space-frequency component matrices may be used to construct a space-frequency matrix corresponding to one transport layer. In other words, the space-frequency matrix may approximate to the weighted sum of the space-frequency component matrix that is determined by using the one or more selected spatial domain vectors and the one or more selected frequency domain vectors. Herein, the spatial domain vector and the frequency domain vector that are used to construct the space-frequency component matrix may be referred to as a space-frequency vector pair.

Therefore, after obtaining the spatial domain vector, the frequency domain vector, and the weighting coefficient that may be used to construct the space-frequency matrix, the network device may further determine, based on the constructed space-frequency matrix, a precoding vector corresponding to each frequency domain unit.

It is assumed that there is one transport layer and there are two polarization directions for the transmit antenna.

In a possible implementation, the terminal device may feed back an indication of L spatial domain vectors, an indication of M frequency domain vectors, and an indication of K weighting coefficients to the network device. The L spatial domain vectors may be fed back based on the two polarization directions, and may be shared for the two polarization directions. The M frequency domain vectors may also be fed back based on the two polarization directions, and may be shared for the two polarization directions. The L spatial domain vectors and the M frequency domain vectors may be used to construct L×M space-frequency vector pairs. The L×M space-frequency vector pairs may be shared for the two polarization directions, and each polarization direction is corresponding to L×M space-frequency vector pairs. In this case, a sum of quantities of space-frequency vector pairs corresponding to the two polarization directions is 2L×M. The K weighting coefficients may be corresponding to some or all of the 2L×M space-frequency vector pairs in the two polarization directions, that is, K≤2L×M. L×M space-frequency vector pairs in a first polarization direction in the two polarization directions may be the same as L×M space-frequency vector pairs in a second polarization direction in the two polarization directions. However, due to different corresponding polarization directions, a sum of quantities of the space-frequency vector pairs corresponding to the two polarization directions is still denoted as 2L×M.

In another possible implementation, the terminal device may feed back an indication of L spatial domain vectors and an indication of M frequency domain vectors to the network device based on each polarization direction, and may feed back an indication of K weighting coefficients to the network device based on the two polarization directions. The L spatial domain vectors and the M frequency domain vectors that are fed back based on each polarization direction may be used to construct L×M space-frequency vector pairs. In this case, a sum of quantities of space-frequency vector pairs corresponding to the two polarization directions is 2L×M. The K weighting coefficients may be corresponding to some or all of the 2L×M space-frequency vector pairs in the two polarization directions, that is, K≤2L×M. L spatial domain vectors fed back based on a first polarization direction may be the same as or different from L spatial domain vectors fed back based on a second polarization direction. M frequency domain vectors fed back based on the first polarization direction may be the same as or different from M frequency domain vectors fed back based on the second polarization direction. Therefore, L×M space-frequency vector pairs in the first polarization direction in the two polarization directions may be completely different from or may be partially or completely the same as L×M space-frequency vector pairs in the second polarization direction in the two polarization directions. This is not limited in this application. However, due to different corresponding polarization directions, a sum of quantities of the space-frequency vector pairs corresponding to the two polarization directions is still denoted as 2L×M.

Because the K weighting coefficients fed back by the terminal device may be in one-to-one correspondence with K space-frequency vector pairs in the 2L×M space-frequency vector pairs, a quantity of weighting coefficients is equal to that of space-frequency vector pairs. That the terminal device feeds back the K weighting coefficients can be understood as selection of the K space-frequency vector pairs from the 2L×M space-frequency vector pairs. Therefore, it can be understood that the terminal device feeds back K space-frequency vector pairs that may be used to construct a precoding vector.

It should be understood that, merely for ease of understanding, the foregoing describes a possible implementation of dual-domain compression. However, this should not constitute any limitation on this application. For example, the L spatial domain vectors and/or the M frequency domain vectors may be predefined. This is not limited in this application.

In summary, compression is performed both in space domain and frequency domain during the dual-domain compression. When performing feedback, the terminal device may feed back the one or more selected spatial domain vectors and the one or more selected frequency domain vectors to the network device, and does not need to feed back, based on each frequency domain unit (such as each subband), a weighting coefficient (for example, including an amplitude and a phase) of the subband. Therefore, feedback overheads can be greatly reduced. In addition, because a frequency domain vector can indicate a change law of a channel in frequency domain, linear superposition is performed on one or more frequency domain vectors to simulate a change of the channel in frequency domain. In this way, relatively high feedback precision can still be kept, so that the precoding matrix that is restored by the network device based on the feedback of the terminal device can still well adapt to the channel.

However, in a feedback manner based on the dual-domain compression, reporting quantities of space-frequency vectors, frequency domain vectors, and weighting coefficients are not defined explicitly. Different combinations of parameters L, M, and K may be obtained by using different values of any one of L, M, and K. However, if all values of L, M, and K are arbitrarily combined, many combinations are obtained. If the network device performs selection based on a plurality of combinations, a relatively large calculation amount may be caused, and relatively high indication overheads may be incurred when the indications are provided for the terminal device. Moreover, in some cases, feedback overheads resulting from different combinations of L, M, and K are the same as or approximate to each other, but precoding vectors restored based on feedbacks and obtained performance differ from each other greatly. In this case, it is unnecessary to retain all the plurality of combinations of L, M, and K, and only a combination of L, M, and K with better performance is retained.

In view of this, an embodiment of this application provides a parameter configuration method, to narrow down selection ranges of reporting quantities by using limited several combinations of L, M, and K, thereby reducing a calculation amount of the network device and avoiding unnecessary indication overheads.

With reference to the accompanying drawings, the following details the parameter configuration method and a communications apparatus that are provided in the embodiments of this application.

For ease of understanding the embodiments of this application, the following interpretations are first given before the embodiments of this application are described.

I. In the following embodiments, one of at least one transport layer and two polarization directions for a transmit antenna are used as an example for detailing the parameter configuration method provided in the embodiments of this application.

It should be noted that, when quantities related to the two polarization directions are involved, quantities of space-frequency vector pairs in the two polarization directions are separately counted. For example, when same L×M space-frequency vector pairs are shared for the two polarization directions, a total quantity of space-frequency vector pairs corresponding to the two polarization directions is still denoted as 2L×M. Even though there is a same space-frequency vector pair between L×M space-frequency vector pairs in the first polarization direction and L×M space-frequency vector pairs in the second polarization direction, the L×M space-frequency vector pairs in the first polarization direction and the L×M space-frequency vector pairs in the second polarization direction are separately counted due to different corresponding polarization directions.

Similar processing is performed on other parameters in the embodiments of this application such as a weighting coefficient. For brevity, no examples are provided for description herein.

For ease of understanding, related descriptions are provided for the following parameters.

L represents a reporting quantity of space-frequency vectors that is configured in a first mapping relationship group and that is corresponding to one polarization direction. There may be a plurality of possible values for L, and L is a positive integer.

M represents a reporting quantity of frequency domain vectors that is configured in the first mapping relationship group and that is corresponding to one polarization direction. There may be a plurality of possible values for M, and M is a positive integer.

K represents a reporting quantity of weighting coefficients corresponding to two polarization directions, or in other words, K represents a total quantity of space-frequency vector pairs that are in the two polarization directions and that are used to construct a precoding vector. There may be a plurality of possible values for K, and K is a positive integer. In the embodiments of this application, K is less than or equal to 2L×M, and 2L×M represents a total quantity of space-frequency vector pairs constructed in the two polarization directions separately by using the L spatial domain vectors and the M frequency domain vectors, that is, represents a sum of quantities of space-frequency vector pairs corresponding to the two polarization directions.

$L_0$ represents a reporting quantity of spatial domain vectors that are indicated by the network device and that are corresponding to one polarization direction. $L_0$ is one of the plurality of possible values of L, and $L_0$ is a positive integer.

$M_0$ represents a reporting quantity of frequency domain vectors that are indicated by the network device and that are corresponding to one polarization direction. $M_0$ is one of the plurality of possible values of M, and $M_0$ is a positive integer.

$K_0$ represents a reporting quantity of space-frequency vector pairs that are indicated by the network device and that are corresponding to one polarization direction. $K_0$ is one of the plurality of possible values of K, and $K_0$ is a positive integer. In the embodiments of this application, $K_0$ is less than or equal to $2L_0 \times M_0$.

II. In the following embodiments, "preconfiguration" and "predefinition" may be implemented by prestoring corresponding code or a corresponding table in devices (for example, including the terminal device and the network device) or implemented in another manner that can be used to indicate related information. A specific implementation thereof is not limited in this application. "Storage" may mean storage performed in one or more memories. The one or more memories may be disposed separately, or may be integrated into an encoder, a decoder, a processor, or a communications apparatus. Alternatively, some of the one or more memories may be disposed separately, and some others may be integrated into a decoder, a processor, or a communications apparatus. A type of the memory may be a storage medium in any form, and is not limited in this application.

III. "Protocols" in the embodiments of this application may be standard protocols in the communications field, and may include, for example, an LTE protocol, an NR protocol, and a related protocol applied to a future communications system. This is not limited in this application.

IV. In the following embodiments, "first", "second", "third", "fourth", and various numbers are merely used for differentiation for ease of description, but are not used to limit the scope of the embodiments of this application. For example, the numbers are used to differentiate between different indication information and different mapping relationships.

V. Definitions of many characteristics (for example, a Kronecker product, a PMI, a frequency domain unit, dual-domain compression, a spatial domain vector, a frequency domain vector, and a CSI-RS) in this application are merely used as examples to interpret functions of these characteristics. For detailed content thereof, refer to the conventional technology.

VI. In the embodiments of this application, "indications" may include a direct indication and an indirect indication, and may also include an explicit indication and an implicit indication. If information indicated by using specific information (such as an indication of a first mapping relationship described below) is referred to as to-be-indicated information, in a specific implementation process, there are many manners for indicating the to-be-indicated information. For example, the manners are not limited to directly indicating the to-be-indicated information such as indicating the to-be-indicated information itself or an index of the to-be-indicated information. Alternatively, the to-be-indicated information may be indirectly indicated by indicating other information, where there is an association relationship between the other information and the to-be-indicated information. Alternatively, only a part of the to-be-indicated information may be indicated, and the other part of the to-be-indicated information is known or is agreed in advance. For example, alternatively, a sorting order of a variety of information pre-agreed (for example, specified in a protocol) may be used to indicate specific information, to reduce indication overheads to some extent. In addition, common parts of the variety of information may further be identified and then indicated together, to reduce indication overheads caused by separately indicating the same information. For example, a person skilled in the art should understand that a precoding matrix includes precoding vectors, and the precoding vectors in the precoding matrix may have a same part in terms of composition or other attributes.

Moreover, specific indication manners may be various existing indication manners, for example, but not limited to, the foregoing indication manners and various combinations thereof. For specific details of the various indication manners, refer to the conventional technology. Details are not described in this specification. It can be learnt from the foregoing that, for example, when a plurality of pieces of information with a same type need to be indicated, different information may be indicated in different manners. In a specific implementation process, a required indication manner may be selected depending on a specific requirement, and the selected indication manner is not limited in the embodiments of this application. In this way, the indication manners in the embodiments of this application should be understood as covering various methods that enable a to-be-indicated party to learn the to-be-indicated information.

Furthermore, the to-be-indicated information may have other equivalent forms. For example, a row vector may be represented as a column vector; a matrix may be represented as a transposed matrix of the matrix; a matrix may be represented in a form of a vector or an array, where the vector or the array may be formed by arranging row vectors or column vectors of the matrix; a Kronecker product of two vectors may be represented in a form such as a product of one vector and a transposed vector of another vector. Technical solutions provided in the embodiments of this application should be understood as covering various forms. For example, some or all characteristics in the embodiments of this application should be understood as covering various representation forms of the characteristics.

The to-be-indicated information may be sent as a whole, or may be separately sent in a form of a plurality of pieces of sub-information. Sending periods and/or sending opportunities of these pieces of sub-information may be identical or different. A specific sending method is not limited in this application. The sending periods and/or the sending opportunities of these pieces of sub-information may be predefined, for example, predefined according to a protocol; or may be configured by sending configuration information by a transmit-end device to a receive-end device. The configuration information may include but is not limited to one or a combination of at least two of the following: radio resource control signaling such as RRC signaling, MAC layer signaling such as MAC-CE signaling, and physical layer signaling such as downlink control information (DCI).

VII. "At least one" means one or more, and "a plurality of" means two or more. The term "and/or" describes an association relationship for describing associated objects and represents that three relationships may exist. For example, A and/or B may represent the following three cases: Only A exists, both A and B exist, and only B exists, where A and B may be singular or plural. The character "/" generally indicates an "or" relationship between the associated objects. "The following at least one (item)" or a similar expression thereof means any combination of these items, including a singular (item) or any combination of a plural (items). For example, at least one (item) of a, b, and c may represent a; b; c; a and b; a and c; b and c; or a, b, and c, where a, b, and c each may be in a singular or plural form.

It should be understood that, the parameter configuration method provided in the embodiments of this application can be applied to a system, for example, the communications system 100 shown in FIG. 1, in which communication is performed by using a multiple-antenna technology. The communications system may include at least one network device and at least one terminal device. The network device and the terminal device may communicate with each other by using the multiple-antenna technology.

It should also be understood that a specific structure of an entity for performing the method provided in the embodiments of this application is not particularly limited in the following embodiments, provided that a program that records code for performing the method provided in the embodiments of this application can be run to perform communication according to the method provided in the embodiments of this application. For example, the entity for performing the method provided in the embodiments of this application may be the terminal device or the network device, or may be a functional module, in the terminal device or the network device, that can invoke and execute the program.

It should also be understood that, for ease of description, the following uses one of at least one transport layer as an example for detailing the parameter configuration method provided in the embodiments of this application. A parameter that is configured for the terminal device by using the parameter configuration method may be configured for one (for example, the first transport layer) of the at least one transport layer, or may be configured for each of the at least one transport layer. This is not limited in this application.

For example, when there are a plurality of transport layers, a quantity of spatial domain vectors, a quantity of frequency domain vectors, and a quantity of weighting coefficients that are reported for each transport layer may be determined by using the parameter configuration method provided in this application.

For another example, when there are a plurality of transport layers, a relationship between reporting quantities of spatial domain vectors configured for different transport layers, a relationship between reporting quantities of frequency domain vectors configured for different transport layers, and a relationship between reporting quantities of weighting coefficients configured for different transport layers may be predefined. For various transport layers, the relationship between the reporting quantities of spatial domain vectors, the relationship between the reporting quantities of frequency domain vectors, and the relationship between the reporting quantities of weighting coefficients are not limited in this application.

Figure 2:
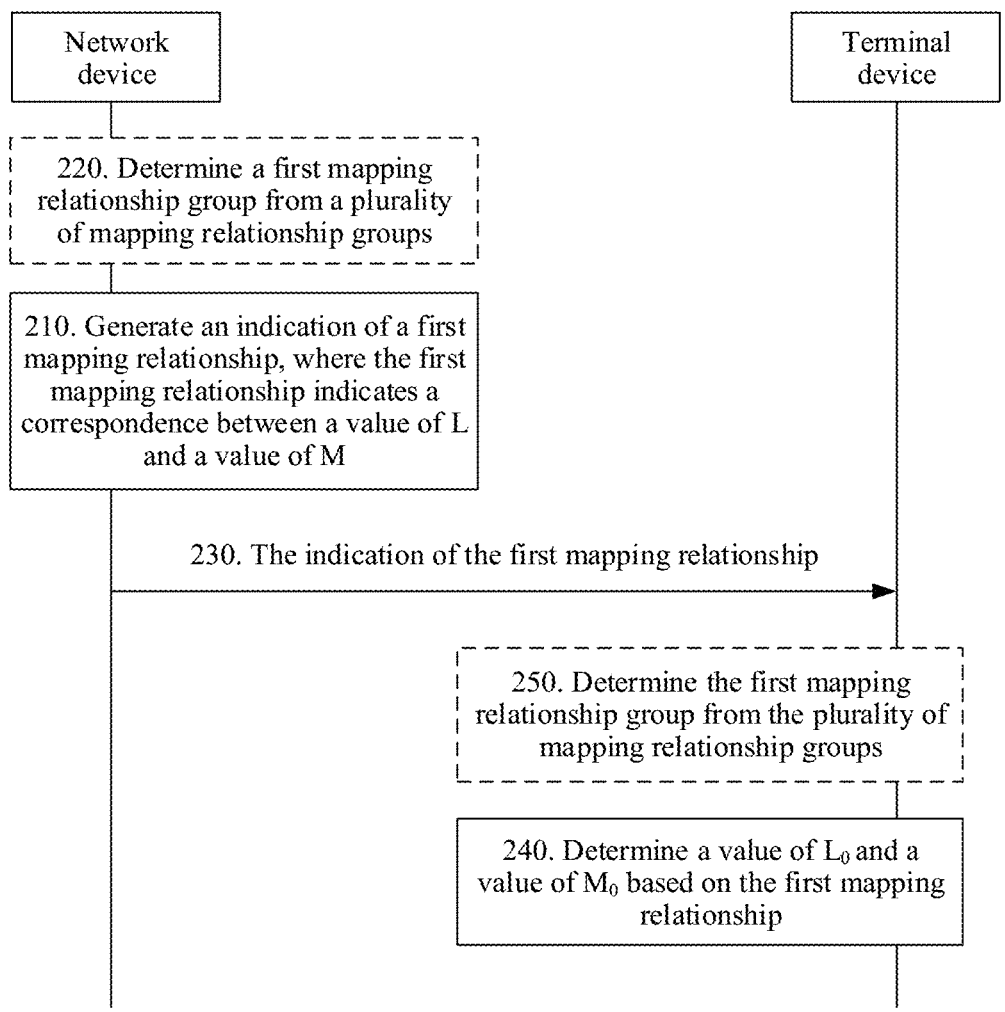
FIG. 2 is a schematic flowchart of a parameter configuration method according to an embodiment of this application.

In general, the following uses interaction between the network device and the terminal device as an example for detailing the parameter configuration method provided in the embodiments of this application. FIG. 2 is a schematic flowchart of a parameter configuration method 200 described from a perspective of interaction between devices according to an embodiment of this application. As shown in the figure, the method 200 includes operation 210 to operation 250. The following details the operations in the method 200.

In operation 210, the network device generates an indication of a first mapping relationship, where the first mapping relationship is used to indicate a correspondence between a reporting quantity of spatial domain vectors and a reporting quantity of frequency domain vectors.

Specifically, the first mapping relationship may be a mapping relationship in a preconfigured mapping relationship group. For ease of differentiation and description, the mapping relationship group including the first mapping relationship is referred to as a first mapping relationship group. The first mapping relationship group may include one or more mapping relationships, and each mapping relationship is used to indicate a correspondence between a reporting quantity of spatial domain vectors and a reporting quantity of frequency domain vectors. In other words, the first mapping relationship group is used to indicate one or more correspondences between the reporting quantity of spatial domain vectors and the reporting quantity of frequency domain vectors. A correspondence between a value of L and a value of M may be understood as a combination of the value of L and the value of M. In this case, the first mapping relationship group may include one group of a value of L and a value of M or a combination of a plurality of groups of values of L and values of M.

In addition, for ease of differentiation and description, in the following embodiments, the reporting quantity of spatial domain vectors listed in the first mapping relationship group is denoted as a parameter L, and the reporting quantity of frequency domain vectors listed in the first mapping relationship group is denoted as a parameter M. For a purpose of differentiation, the reporting quantity of spatial domain vectors indicated in the first mapping relationship is denoted as $L_0$, and the reporting quantity of frequency domain vectors indicated in the first mapping relationship is denoted as $M_0$. It can be understood that $L_0$ is one of a plurality of values of L in the first mapping relationship group, and $M_0$ is one of a plurality of values of M in the first mapping relationship group.

The first mapping relationship group may be preconfigured, for example, may be prestored in the network device. For example, the network device may determine which mapping relationship in the first mapping relationship group is to be used, based on factors such as a quantity of antenna ports, a channel condition, historical data, or a feedback precision requirement. For example, when a relatively high feedback precision requirement is imposed, relatively high feedback overheads may be considered for use, to obtain a feedback with relatively high precision. For another example, when there are four antenna ports, in a plurality of possible first mapping relationship groups listed below, a value of L is only 2. When there are eight antenna ports, in a plurality of possible first mapping relationship groups listed below, a value of L may be 2, 3, or 4 only.

When determining to use a specific mapping relationship in the first mapping relationship group, the network device may indicate the selected mapping relationship, that is, the first mapping relationship in this embodiment of this application, to the terminal device by using signaling. The indication of the first mapping relationship may be, for example, the first mapping relationship, may be an index of the first mapping relationship in the first mapping relationship group, or may be other information that can be used to determine the first mapping relationship. This is not limited in this application.

The first mapping relationship group may be, for example, in a form of a table, and the table may include one group of a value of L and a value of M or a combination of a plurality of groups of values of L and values of M. The first mapping relationship group may alternatively be in another form that can be used to indicate a correspondence between the value of L and the value of M. This is not limited in this application.

For ease of understanding, the following lists possible forms of the first mapping relationship group by using tables. The network device may prestore one or more of the following tables or a mapping relationship group corresponding to one or more of the following tables. It should be understood that each of the following tables may be used as an example of the first mapping relationship group. The tables may be independent of each other. Each table lists a plurality of possible combinations of values of L and values of M.

TABLE 1

| Index | Parameter | |
|---|---|---|
| | L | M |
| 0 | 2 | 3 |
| 1 | 3 | 3 |
| 2 | 4 | 3 |
| 3 | 4 | 4 |

TABLE 2

| Index | Parameter | |
|---|---|---|
| | L | M |
| 0 | 2 | 3 |
| 1 | 3 | 4 |
| 2 | 4 | 4 |
| 3 | 4 | 6 |

TABLE 3

| Index | Parameter | |
|---|---|---|
| | L | M |
| 0 | 2 | 3 |
| 1 | 3 | 4 |
| 2 | 3 | 6 |
| 3 | 4 | 6 |

TABLE 4

| Index | Parameter | |
|---|---|---|
| | L | M |
| 0 | 2 | 3 |
| 1 | 4 | 3 |
| 2 | 4 | 4 |
| 3 | 4 | 6 |

TABLE 5

| Index | Parameter | |
|---|---|---|
| | L | M |
| 0 | 2 | 4 |
| 1 | 3 | 4 |
| 2 | 4 | 4 |
| 3 | 4 | 6 |

TABLE 6

| Index | Parameter | |
|---|---|---|
| | L | M |
| 0 | 2 | 4 |
| 1 | 3 | 4 |
| 2 | 3 | 6 |
| 3 | 4 | 6 |

TABLE 7

| Index | Parameter | |
|---|---|---|
| | L | M |
| 0 | 2 | 4 |
| 1 | 2 | 6 |
| 2 | 3 | 6 |
| 3 | 4 | 6 |

TABLE 8

| Index | Parameter | |
|---|---|---|
| | L | M |
| 0 | 3 | 2 |
| 1 | 4 | 3 |
| 2 | 4 | 4 |
| 3 | 4 | 6 |

TABLE 9

| Index | Parameter | |
|---|---|---|
| | L | M |
| 0 | 2 | 3 |
| 1 | 3 | 5 |
| 2 | 4 | 6 |
| 3 | 4 | 8 |

TABLE 10

| Index | Parameter L | Parameter M |
|---|---|---|
| 0 | 2 | 3 |
| 1 | 3 | 4 |
| 2 | 4 | 6 |
| 3 | 4 | 8 |

TABLE 11

| Index | Parameter L | Parameter M |
|---|---|---|
| 0 | 2 | 3 |
| 1 | 3 | 4 |
| 2 | 4 | 5 |
| 3 | 4 | 8 |

TABLE 12

| Index | Parameter L | Parameter M |
|---|---|---|
| 0 | 2 | 4 |
| 1 | 3 | 5 |
| 2 | 4 | 6 |
| 3 | 4 | 8 |

TABLE 13

| Index | Parameter L | Parameter M |
|---|---|---|
| 0 | 2 | 3 |
| 1 | 2 | 4 |
| 2 | 3 | 4 |
| 3 | 3 | 5 |
| 4 | 4 | 5 |
| 5 | 4 | 6 |

TABLE 14

| Index | Parameter L | Parameter M |
|---|---|---|
| 0 | 2 | 3 |
| 1 | 2 | 4 |
| 2 | 3 | 4 |
| 3 | 4 | 4 |
| 4 | 4 | 5 |
| 5 | 4 | 6 |

TABLE 15

| Index | Parameter L | Parameter M |
|---|---|---|
| 0 | 2 | 3 |
| 1 | 3 | 3 |
| 2 | 4 | 3 |
| 3 | 4 | 4 |
| 4 | 4 | 5 |
| 5 | 4 | 6 |

TABLE 16

| Index | Parameter L | Parameter M |
|---|---|---|
| 0 | 2 | 3 |
| 1 | 3 | 3 |
| 2 | 3 | 4 |
| 3 | 4 | 4 |
| 4 | 4 | 5 |
| 5 | 4 | 6 |

TABLE 17

| Index | Parameter L | Parameter M |
|---|---|---|
| 0 | 2 | 3 |
| 1 | 3 | 4 |
| 2 | 3 | 5 |
| 3 | 4 | 5 |
| 4 | 4 | 6 |
| 5 | 4 | 8 |

TABLE 18

| Index | Parameter L | Parameter M |
|---|---|---|
| 0 | 2 | 3 |
| 1 | 3 | 4 |
| 2 | 4 | 4 |
| 3 | 4 | 5 |
| 4 | 4 | 6 |
| 5 | 4 | 8 |

TABLE 19

| Index | Parameter L | Parameter M |
|---|---|---|
| 0 | 2 | 3 |
| 1 | 3 | 3 |
| 2 | 4 | 3 |
| 3 | 4 | 4 |
| 4 | 4 | 6 |
| 5 | 4 | 8 |

TABLE 20

| Index | Parameter L | Parameter M |
|---|---|---|
| 0 | 2 | 4 |
| 1 | 3 | 4 |

TABLE 20-continued

| Index | Parameter L | M |
|---|---|---|
| 2 | 4 | 4 |
| 3 | 4 | 5 |
| 4 | 4 | 6 |
| 5 | 4 | 8 |

TABLE 21

| Index | Parameter L | M |
|---|---|---|
| 0 | 2 | 4 |
| 1 | 3 | 4 |
| 2 | 3 | 5 |
| 3 | 4 | 5 |
| 4 | 4 | 6 |
| 5 | 4 | 8 |

TABLE 22

| Index | Parameter L | M |
|---|---|---|
| 0 | 2 | 3 |
| 1 | 2 | 4 |
| 2 | 3 | 4 |
| 3 | 3 | 5 |
| 4 | 4 | 5 |
| 5 | 4 | 6 |
| 6 | 4 | 8 |

TABLE 23

| Index | Parameter L | M |
|---|---|---|
| 0 | 2 | 3 |
| 1 | 3 | 3 |
| 2 | 4 | 4 |
| 3 | 6 | 4 |

TABLE 24

| Index | Parameter L | M |
|---|---|---|
| 0 | 2 | 3 |
| 1 | 3 | 4 |
| 2 | 4 | 4 |
| 3 | 6 | 4 |

TABLE 25

| Index | Parameter L | M |
|---|---|---|
| 0 | 2 | 3 |
| 1 | 4 | 3 |

TABLE 25-continued

| Index | Parameter L | M |
|---|---|---|
| 2 | 4 | 4 |
| 3 | 6 | 4 |

TABLE 26

| Index | Parameter L | M |
|---|---|---|
| 0 | 2 | 3 |
| 1 | 2 | 4 |
| 2 | 3 | 4 |
| 3 | 3 | 5 |
| 4 | 4 | 5 |
| 5 | 6 | 4 |

TABLE 27

| Index | Parameter L | M |
|---|---|---|
| 0 | 2 | 3 |
| 1 | 2 | 4 |
| 2 | 3 | 4 |
| 3 | 4 | 4 |
| 4 | 4 | 5 |
| 5 | 6 | 4 |

TABLE 28

| Index | Parameter L | M |
|---|---|---|
| 0 | 2 | 3 |
| 1 | 3 | 3 |
| 2 | 4 | 3 |
| 3 | 4 | 4 |
| 4 | 4 | 5 |
| 5 | 6 | 4 |

TABLE 29

| Index | Parameter L | M |
|---|---|---|
| 0 | 2 | 3 |
| 1 | 3 | 3 |
| 2 | 3 | 4 |
| 3 | 4 | 4 |
| 4 | 4 | 5 |
| 5 | 6 | 4 |

TABLE 30

| Index | Parameter L | M |
|---|---|---|
| 0 | 2 | 4 |
| 1 | 3 | 4 |
| 2 | 4 | 4 |
| 3 | 6 | 4 |

TABLE 31

| Index | Parameter L | Parameter M |
|---|---|---|
| 0 | 3 | 2 |
| 1 | 4 | 3 |
| 2 | 4 | 4 |
| 3 | 6 | 4 |

TABLE 32

| Index | Parameter L | Parameter M |
|---|---|---|
| 0 | 2 | 3 |
| 1 | 3 | 4 |
| 2 | 4 | 4 |
| 3 | 6 | 5 |

TABLE 33

| Index | Parameter L | Parameter M |
|---|---|---|
| 0 | 2 | 3 |
| 1 | 3 | 4 |
| 2 | 4 | 5 |
| 3 | 6 | 5 |

TABLE 34

| Index | Parameter L | Parameter M |
|---|---|---|
| 0 | 2 | 3 |
| 1 | 2 | 4 |
| 2 | 3 | 4 |
| 3 | 3 | 5 |
| 4 | 4 | 5 |
| 5 | 6 | 5 |

TABLE 35

| Index | Parameter L | Parameter M |
|---|---|---|
| 0 | 2 | 3 |
| 1 | 2 | 4 |
| 2 | 3 | 4 |
| 3 | 4 | 4 |
| 4 | 4 | 5 |
| 5 | 6 | 5 |

TABLE 36

| Index | Parameter L | Parameter M |
|---|---|---|
| 0 | 2 | 3 |
| 1 | 3 | 3 |
| 2 | 4 | 3 |
| 3 | 4 | 4 |

TABLE 36-continued

| Index | Parameter L | Parameter M |
|---|---|---|
| 4 | 4 | 5 |
| 5 | 6 | 5 |

TABLE 37

| Index | Parameter L | Parameter M |
|---|---|---|
| 0 | 2 | 3 |
| 1 | 3 | 3 |
| 2 | 3 | 4 |
| 3 | 4 | 4 |
| 4 | 4 | 5 |
| 5 | 6 | 5 |

TABLE 38

| Index | Parameter L | Parameter M |
|---|---|---|
| 0 | 2 | 3 |
| 1 | 3 | 4 |
| 2 | 4 | 5 |
| 3 | 6 | 6 |

TABLE 39

| Index | Parameter L | Parameter M |
|---|---|---|
| 0 | 2 | 3 |
| 1 | 3 | 4 |
| 2 | 4 | 6 |
| 3 | 6 | 6 |

TABLE 40

| Index | Parameter L | Parameter M |
|---|---|---|
| 0 | 2 | 3 |
| 1 | 3 | 5 |
| 2 | 4 | 6 |
| 3 | 6 | 6 |

TABLE 41

| Index | Parameter L | Parameter M |
|---|---|---|
| 0 | 2 | 3 |
| 1 | 4 | 4 |
| 2 | 6 | 4 |
| 3 | 6 | 6 |

TABLE 42

| Index | Parameter | |
|---|---|---|
| | L | M |
| 0 | 2 | 3 |
| 1 | 4 | 4 |
| 2 | 4 | 6 |
| 3 | 6 | 6 |

TABLE 43

| Index | Parameter | |
|---|---|---|
| | L | M |
| 0 | 2 | 4 |
| 1 | 3 | 5 |
| 2 | 4 | 6 |
| 3 | 6 | 6 |

TABLE 44

| Index | Parameter | |
|---|---|---|
| | L | M |
| 0 | 2 | 4 |
| 1 | 4 | 4 |
| 2 | 6 | 4 |
| 3 | 6 | 6 |

TABLE 45

| Index | Parameter | |
|---|---|---|
| | L | M |
| 0 | 3 | 2 |
| 1 | 4 | 3 |
| 2 | 6 | 4 |
| 3 | 6 | 6 |

TABLE 46

| Index | Parameter | |
|---|---|---|
| | L | M |
| 0 | 2 | 3 |
| 1 | 2 | 4 |
| 2 | 3 | 4 |
| 3 | 3 | 5 |
| 4 | 4 | 6 |
| 5 | 6 | 6 |

TABLE 47

| Index | Parameter | |
|---|---|---|
| | L | M |
| 0 | 2 | 3 |
| 1 | 2 | 4 |
| 2 | 3 | 4 |
| 3 | 4 | 4 |
| 4 | 4 | 5 |
| 5 | 6 | 6 |

TABLE 48

| Index | Parameter | |
|---|---|---|
| | L | M |
| 0 | 2 | 3 |
| 1 | 3 | 3 |
| 2 | 4 | 3 |
| 3 | 4 | 4 |
| 4 | 6 | 4 |
| 5 | 6 | 6 |

TABLE 49

| Index | Parameter | |
|---|---|---|
| | L | M |
| 0 | 2 | 3 |

TABLE 50

| Index | Parameter | |
|---|---|---|
| | L | M |
| 0 | 2 | 3 |
| 1 | 3 | 3 |
| 2 | 4 | 4 |
| 3 | 6 | 4 |
| 4 | 6 | 5 |
| 5 | 6 | 6 |

TABLE 51

| Index | Parameter | |
|---|---|---|
| | L | M |
| 0 | 2 | 3 |
| 1 | 3 | 4 |
| 2 | 4 | 4 |
| 3 | 6 | 4 |
| 4 | 6 | 5 |
| 5 | 6 | 6 |

TABLE 52

| Index | Parameter | |
|---|---|---|
| | L | M |
| 0 | 2 | 4 |
| 1 | 3 | 4 |
| 2 | 4 | 4 |
| 3 | 6 | 4 |
| 4 | 6 | 5 |
| 5 | 6 | 6 |

TABLE 53

| Index | Parameter | |
|---|---|---|
| | L | M |
| 0 | 2 | 3 |
| 1 | 3 | 5 |

TABLE 53-continued

| Index | Parameter | |
|---|---|---|
| | L | M |
| 2 | 4 | 6 |
| 3 | 6 | 8 |

TABLE 54

| Index | Parameter | |
|---|---|---|
| | L | M |
| 0 | 2 | 3 |
| 1 | 3 | 4 |
| 2 | 4 | 6 |
| 3 | 6 | 8 |

TABLE 55

| Index | Parameter | |
|---|---|---|
| | L | M |
| 0 | 2 | 4 |
| 1 | 3 | 5 |
| 2 | 4 | 6 |
| 3 | 6 | 8 |

TABLE 56

| Index | Parameter | |
|---|---|---|
| | L | M |
| 0 | 2 | 3 |
| 1 | 3 | 4 |
| 2 | 4 | 4 |
| 3 | 4 | 6 |
| 4 | 6 | 6 |
| 5 | 6 | 8 |

TABLE 57

| Index | Parameter | |
|---|---|---|
| | L | M |
| 0 | 2 | 3 |
| 1 | 3 | 4 |
| 2 | 4 | 4 |
| 3 | 6 | 4 |
| 4 | 6 | 6 |
| 5 | 6 | 8 |

TABLE 58

| Index | Parameter | |
|---|---|---|
| | L | M |
| 0 | 2 | 4 |
| 1 | 3 | 4 |
| 2 | 4 | 4 |
| 3 | 4 | 6 |
| 4 | 6 | 6 |
| 5 | 6 | 8 |

TABLE 59

| Index | Parameter | |
|---|---|---|
| | L | M |
| 0 | 2 | 4 |
| 1 | 3 | 4 |
| 2 | 4 | 4 |
| 3 | 6 | 4 |
| 4 | 6 | 6 |
| 5 | 6 | 8 |

TABLE 60

| Index | Parameter | |
|---|---|---|
| | L | M |
| 0 | 2 | 3 |
| 1 | 3 | 3 |
| 2 | 4 | 3 |
| 3 | 6 | 4 |

TABLE 61

| Index | Parameter | |
|---|---|---|
| | L | M |
| 0 | 2 | 3 |
| 1 | 4 | 3 |
| 2 | 6 | 4 |
| 3 | 6 | 6 |

TABLE 62

| Index | Parameter | |
|---|---|---|
| | L | M |
| 0 | 2 | 3 |
| 1 | 2 | 4 |
| 2 | 3 | 4 |
| 3 | 4 | 4 |
| 4 | 6 | 4 |
| 5 | 6 | 6 |

TABLE 63

| Index | Parameter | |
|---|---|---|
| | L | M |
| 0 | 2 | 3 |
| 1 | 3 | 3 |
| 2 | 3 | 4 |
| 3 | 4 | 4 |
| 4 | 6 | 4 |
| 5 | 6 | 6 |

TABLE 64

| Index | Parameter | |
|---|---|---|
| | L | M |
| 0 | 2 | 3 |
| 1 | 3 | 3 |
| 2 | 4 | 3 |

TABLE 64-continued

| Index | Parameter L | Parameter M |
|---|---|---|
| 3 | 6 | 3 |
| 4 | 6 | 4 |
| 5 | 6 | 6 |

TABLE 65

| Index | Parameter L | Parameter M |
|---|---|---|
| 0 | 2 | 3 |
| 1 | 4 | 3 |
| 2 | 6 | 3 |
| 3 | 6 | 4 |

TABLE 66

| Index | Parameter L | Parameter M |
|---|---|---|
| 0 | 2 | 2 |
| 1 | 3 | 2 |
| 2 | 3 | 3 |
| 3 | 4 | 3 |

TABLE 67

| Index | Parameter L | Parameter M |
|---|---|---|
| 0 | 2 | 2 |
| 1 | 2 | 3 |
| 2 | 3 | 3 |
| 3 | 4 | 3 |

TABLE 68

| Index | Parameter L | Parameter M |
|---|---|---|
| 0 | 2 | 2 |
| 1 | 3 | 2 |
| 2 | 4 | 2 |
| 3 | 4 | 3 |

TABLE 69

| Index | Parameter L | Parameter M |
|---|---|---|
| 0 | 2 | 2 |
| 1 | 3 | 3 |
| 2 | 4 | 3 |
| 3 | 4 | 4 |

TABLE 70

| Index | Parameter L | Parameter M |
|---|---|---|
| 0 | 2 | 2 |
| 1 | 3 | 2 |
| 2 | 4 | 3 |
| 3 | 4 | 4 |

TABLE 71

| Index | Parameter L | Parameter M |
|---|---|---|
| 0 | 2 | 2 |
| 1 | 4 | 2 |
| 2 | 4 | 3 |
| 3 | 4 | 4 |

TABLE 72

| Index | Parameter L | Parameter M |
|---|---|---|
| 0 | 2 | 2 |
| 1 | 2 | 4 |
| 2 | 3 | 4 |
| 3 | 4 | 4 |

TABLE 73

| Index | Parameter L | Parameter M |
|---|---|---|
| 0 | 2 | 3 |
| 1 | 3 | 4 |
| 2 | 4 | 6 |

TABLE 74

| Index | Parameter L | Parameter M |
|---|---|---|
| 0 | 2 | 3 |
| 1 | 4 | 3 |
| 2 | 4 | 6 |

TABLE 75

| Index | Parameter L | Parameter M |
|---|---|---|
| 0 | 3 | 2 |
| 1 | 4 | 3 |
| 2 | 4 | 6 |

TABLE 76

| Index | Parameter L | Parameter M |
|---|---|---|
| 0 | 2 | 3 |
| 1 | 3 | 5 |
| 2 | 4 | 8 |

TABLE 77

| Index | Parameter L | Parameter M |
|---|---|---|
| 0 | 2 | 3 |
| 1 | 3 | 4 |
| 2 | 4 | 8 |

TABLE 78

| Index | Parameter L | Parameter M |
|---|---|---|
| 0 | 2 | 3 |
| 1 | 4 | 4 |
| 2 | 4 | 8 |

TABLE 79

| Index | Parameter L | Parameter M |
|---|---|---|
| 0 | 2 | 3 |
| 1 | 4 | 3 |
| 2 | 4 | 8 |

TABLE 80

| Index | Parameter L | Parameter M |
|---|---|---|
| 0 | 3 | 2 |
| 1 | 4 | 3 |
| 2 | 4 | 8 |

TABLE 81

| Index | Parameter L | Parameter M |
|---|---|---|
| 0 | 3 | 2 |
| 1 | 4 | 4 |
| 2 | 4 | 8 |

TABLE 82

| Index | Parameter L | Parameter M |
|---|---|---|
| 0 | 2 | 4 |
| 1 | 4 | 4 |
| 2 | 4 | 8 |

TABLE 83

| Index | Parameter L | Parameter M |
|---|---|---|
| 0 | 2 | 4 |
| 1 | 3 | 5 |
| 2 | 4 | 8 |

TABLE 84

| Index | Parameter L | Parameter M |
|---|---|---|
| 0 | 2 | 3 |
| 1 | 4 | 3 |
| 2 | 6 | 4 |

TABLE 85

| Index | Parameter L | Parameter M |
|---|---|---|
| 0 | 2 | 3 |
| 1 | 3 | 4 |
| 2 | 6 | 4 |

TABLE 86

| Index | Parameter L | Parameter M |
|---|---|---|
| 0 | 3 | 2 |
| 1 | 4 | 3 |
| 2 | 6 | 4 |

TABLE 87

| Index | Parameter L | Parameter M |
|---|---|---|
| 0 | 2 | 3 |
| 1 | 4 | 3 |
| 2 | 6 | 5 |

TABLE 88

| Index | Parameter | |
|---|---|---|
| | L | M |
| 0 | 2 | 3 |
| 1 | 3 | 4 |
| 2 | 6 | 5 |

TABLE 89

| Index | Parameter | |
|---|---|---|
| | L | M |
| 0 | 3 | 2 |
| 1 | 4 | 3 |
| 2 | 6 | 5 |

TABLE 90

| Index | Parameter | |
|---|---|---|
| | L | M |
| 0 | 2 | 3 |
| 1 | 4 | 4 |
| 2 | 6 | 5 |

TABLE 91

| Index | Parameter | |
|---|---|---|
| | L | M |
| 0 | 3 | 2 |
| 1 | 4 | 4 |
| 2 | 6 | 5 |

TABLE 92

| Index | Parameter | |
|---|---|---|
| | L | M |
| 0 | 2 | 3 |
| 1 | 3 | 5 |
| 2 | 6 | 5 |

TABLE 93

| Index | Parameter | |
|---|---|---|
| | L | M |
| 0 | 2 | 4 |
| 1 | 4 | 4 |
| 2 | 6 | 5 |

TABLE 94

| Index | Parameter | |
|---|---|---|
| | L | M |
| 0 | 4 | 2 |
| 1 | 4 | 4 |
| 2 | 6 | 5 |

TABLE 95

| Index | Parameter | |
|---|---|---|
| | L | M |
| 0 | 2 | 4 |
| 1 | 3 | 5 |
| 2 | 6 | 5 |

TABLE 96

| Index | Parameter | |
|---|---|---|
| | L | M |
| 0 | 2 | 3 |
| 1 | 4 | 4 |
| 2 | 6 | 6 |

TABLE 97

| Index | Parameter | |
|---|---|---|
| | L | M |
| 0 | 3 | 2 |
| 1 | 4 | 4 |
| 2 | 6 | 6 |

TABLE 98

| Index | Parameter | |
|---|---|---|
| | L | M |
| 0 | 2 | 3 |
| 1 | 3 | 5 |
| 2 | 6 | 6 |

TABLE 99

| Index | Parameter | |
|---|---|---|
| | L | M |
| 0 | 2 | 4 |
| 1 | 4 | 4 |
| 2 | 6 | 6 |

TABLE 100

| Index | Parameter | |
|---|---|---|
| | L | M |
| 0 | 4 | 2 |
| 1 | 4 | 4 |
| 2 | 6 | 6 |

TABLE 101

| Index | Parameter | |
|---|---|---|
| | L | M |
| 0 | 2 | 4 |
| 1 | 3 | 5 |
| 2 | 6 | 6 |

TABLE 102

| Index | Parameter | |
|---|---|---|
| | L | M |
| 0 | 2 | 4 |
| 1 | 3 | 6 |
| 2 | 6 | 6 |

TABLE 103

| Index | Parameter | |
|---|---|---|
| | L | M |
| 0 | 2 | 3 |
| 1 | 3 | 4 |
| 2 | 4 | 6 |
| 3 | 6 | 8 |

TABLE 104

| Index | Parameter | |
|---|---|---|
| | L | M |
| 0 | 2 | 3 |
| 1 | 4 | 3 |
| 2 | 6 | 4 |
| 3 | 6 | 8 |

TABLE 105

| Index | Parameter | |
|---|---|---|
| | L | M |
| 0 | 3 | 2 |
| 1 | 4 | 3 |
| 2 | 6 | 4 |
| 3 | 6 | 8 |

TABLE 106

| Index | Parameter | |
|---|---|---|
| | L | M |
| 0 | 2 | 3 |
| 1 | 3 | 5 |
| 2 | 6 | 8 |

TABLE 107

| Index | Parameter | |
|---|---|---|
| | L | M |
| 0 | 2 | 3 |
| 1 | 3 | 6 |
| 2 | 6 | 8 |

TABLE 108

| Index | Parameter | |
|---|---|---|
| | L | M |
| 0 | 2 | 3 |
| 1 | 4 | 4 |
| 2 | 6 | 8 |

TABLE 109

| Index | Parameter | |
|---|---|---|
| | L | M |
| 0 | 2 | 3 |
| 1 | 4 | 5 |
| 2 | 6 | 8 |

TABLE 110

| Index | Parameter | |
|---|---|---|
| | L | M |
| 0 | 2 | 4 |
| 1 | 4 | 5 |
| 2 | 6 | 8 |

TABLE 111

| Index | Parameter | |
|---|---|---|
| | L | M |
| 0 | 2 | 4 |
| 1 | 3 | 6 |
| 2 | 6 | 8 |

A plurality of combinations of values of L and values of M are listed in the foregoing first mapping relationship groups. In the plurality of possible first mapping relationship groups listed above, the combinations of the values of L and the values of M listed in all the first mapping relationship groups may incur different feedback overheads.

Figure 3:
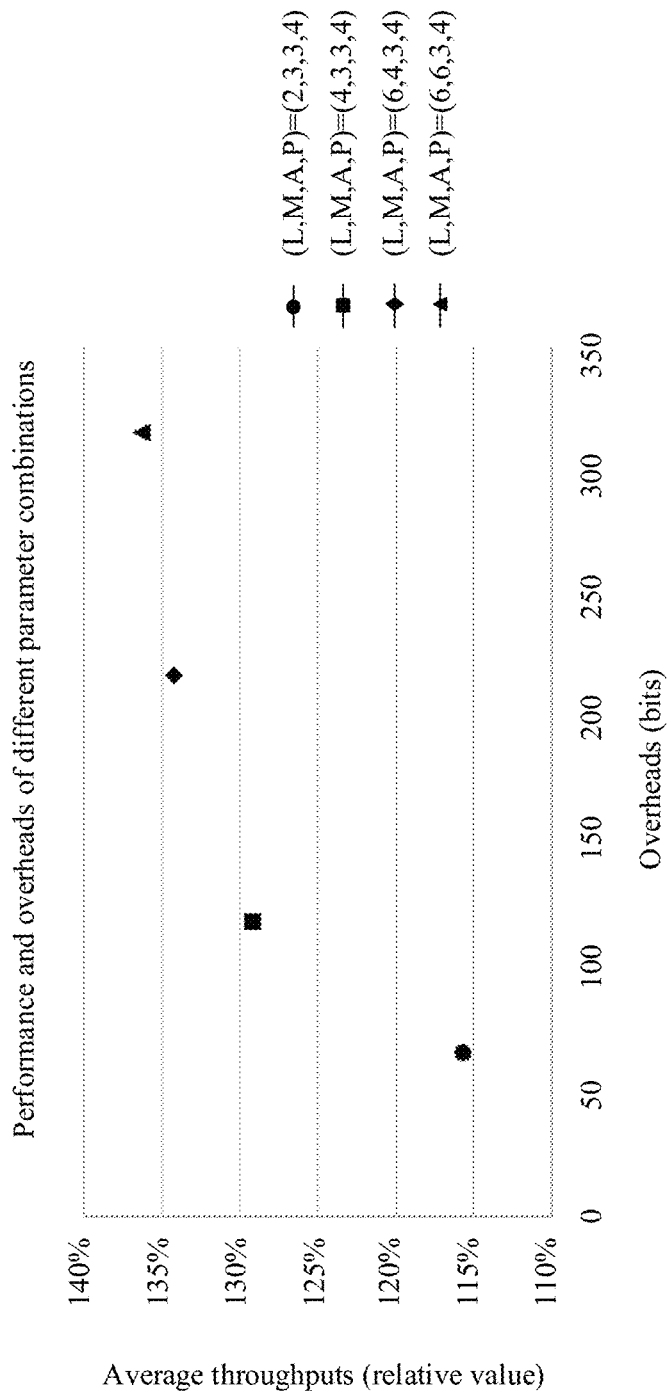
FIG. 3 is a performance simulation diagram according to an embodiment of this application.

FIG. 3 is a performance simulation diagram according to an embodiment of this application. Using values of L and values of M listed in Table 61 as an example, the performance simulation diagram shown in FIG. 3 shows a trend of average throughputs that vary with feedback overheads. Specifically, a simulation result in FIG. 3 may be based on the following assumptions: A ratio between K and 2L×M is 1/2, a quantity of quantization bits of an amplitude is A=3, and a quantity of quantization bits of a phase is P=4. A lateral axis in the figure may indicate feedback overheads, and a longitudinal axis in the figure may indicate average throughputs. It can be learnt that as the feedback overheads resulting from the values of L and the values of M increase, the average throughputs are also increasing.

It should be understood that FIG. 3 shows, merely for ease of understanding, an example of performance simulation provided in this embodiment of this application, and should not constitute any limitation on this application. For example, based on different feedback manners, feedback overheads resulting from a same value of L and a same value of M are different. For example, based on different simulation platforms and different algorithms, average throughputs corresponding to a same value of L, a same value of M, and a same value of K may also be different.

As described above, a precoding vector in each polarization direction may be determined based on some or all of L×M space-frequency vector pairs constructed by using L spatial domain vectors and M frequency domain vectors. Therefore, the terminal device unnecessarily feeds back L×M weighting coefficients based on the L×M space-frequency vector pairs constructed by using the L spatial domain vectors and the M frequency domain vectors, but may feed back weighting coefficients for only some of the L×M space-frequency vector pairs. Therefore, a reporting quantity of weighting coefficients may be considered as a quantity of space-frequency vector pairs used to construct the precoding vector.

When there are two polarization directions, a precoding vector in the two polarization directions may be determined based on some or all of 2L×M space-frequency vector pairs. 2L×M represents a total quantity of space-frequency vector pairs constructed in the two polarization directions separately by using the L spatial domain vectors and the M frequency domain vectors. The reporting quantity of weighting coefficients may be considered as a quantity of space-frequency vector pairs that are in the two polarization directions and that are used to construct the precoding vector.

In this embodiment of this application, the reporting quantity of weighting coefficients may alternatively be preconfigured, or in other words, the quantity of space-frequency vector pairs used to construct the precoding vector may be preconfigured. For ease of description, the reporting quantity of weighting coefficients (or the quantity of space-frequency vector pairs used to construct the precoding vector) may be denoted as K below, where K≤2L×M, and K is a positive integer.

In a possible design, the ratio between K and 2L×M is a preset value. For example, the ratio between K and 2L×M may be a fixed value, or may be configured by the network device.

In an embodiment, the ratio between K and 2L×M is a fixed value.

That there are two polarization directions for a transmit antenna is used as an example. 2L×M may indicate a total quantity of space-frequency vector pairs in the two polarization directions, and K may indicate a quantity of K space-frequency vector pairs selected from the 2L×M pace-frequency vector pairs, or a quantity of weighting coefficients of the K space-frequency vector pairs.

Optionally, the ratio between K and 2L×M is 1/2, or in other words, K=2L×M/2, that is, K=L×M.

Optionally, the ratio between K and 2L×M is 1/3. Herein, that the ratio between K and 2L×M is 1/3 may include that the ratio between K and 2L×M is equal to 1/3 or is approximately equal to 1/3.

Specifically, K=⌈2L×M/3⌉, K=⌊2L×M/3⌋, or K=[2L×M/3] holds true.

Optionally, the ratio between K and 2L×M is 2/3. Herein, that the ratio between K and 2L×M is 2/3 may include that the ratio between K and 2L×M is equal to 2/3 or is approximately equal to 2/3.

Specifically, K=⌈4L×M/3⌉, K=⌊4L×M/3⌋, or K=[4L×M/3] holds true.

⌈ ⌉ represents rounding up to the nearest integer, ⌊ ⌋ represents rounding down to the nearest integer, and [ ] represents rounding to the nearest integer. After rounding is performed in a specific manner defined in a protocol, the network device and the terminal device may determine a value of K in a same manner.

A case in which the ratio between K and 2L×M is a fixed value is particularly applicable to the foregoing mapping relationship groups listed in Table 1 to Table 72.

It should be understood that the foregoing lists examples of several possible ratios between K and 2L×M, but this should not constitute any limitation on this application. All methods for determining a value of $K_0$ based on the ratio between K and 2L×M and predetermined values of $L_0$ and $M_0$ shall fall within the protection scope of this application.

It should also be understood that the foregoing uses two polarization directions merely as an example to list several possible ratios between K and 2L×M. The foregoing ratio between K and 2L×M may alternatively be adjusted to a ratio between K and L×M, a ratio between 2K' (where K'=K/2) and 2L×M, or the like. This is not limited in this application.

In another embodiment, the ratio between K and 2L×M is indicated by the network device.

Optionally, the method further includes: The terminal device receives first indication information, where the first indication information is used to indicate the ratio between K and 2L×M. Correspondingly, the network device sends the first indication information.

In other words, there may be a plurality of possible values for the ratio between K and 2L×M. The network device may indicate the ratio between K and 2L×M to the terminal device by using the first indication information. Specifically, the first indication information may directly indicate the ratio between K and 2L×M, may indicate an index of the ratio between K and 2L×M, or may indicate other information that can be used to determine the ratio between K and 2L×M. This is not limited in this application.

The first indication information may be carried in higher layer signaling. The higher layer signaling may be, for example, an RRC message or a MAC CE. The first indication information may alternatively be carried in physical layer signaling. The physical layer signaling may be, for example, DCI. Specific signaling carrying the first indication information is not limited in this application. The signaling carrying the first indication information may be existing signaling, or may be newly added signaling.

Optionally, the ratio between K and 2L×M is 1/4 or 1/2. Herein, that the ratio between K and 2L×M is 1/4 or 1/2 may include that the ratio between K and 2L×M is equal to 1/4 or is approximately equal to 1/4, or the ratio between K and 2L×M is equal to 1/2.

Specifically, K=L×M, K=⌊L×M/2⌋, K=⌈L×M/2⌉, or K=[L×M/2] holds true.

Optionally, the ratio between K and 2L×M is 1/3 or 2/3.

Specifically, K=⌊2L×M/3⌋, K=⌈2L×M/3⌉, K=[2L×M/3], K=⌊4L×M/3⌋, K=⌈4L×M/3⌉, or K=[4L×M/3] holds true.

⌈ ⌉ represents rounding up to the nearest integer, ⌊ ⌋ represents rounding down to the nearest integer, and [ ] represents rounding to the nearest integer. After rounding is performed in a specific manner defined in a protocol, the network device and the terminal device may determine a value of K in a same manner.

A case in which the ratio between K and 2L×M is configured by the network device is particularly applicable to the foregoing mapping relationship groups listed in Table 73 to Table 111.

It should be understood that the foregoing lists examples of several possible ratios between K and 2L×M, but this should not constitute any limitation on this application. All methods for determining a value of $K_0$ based on the ratio between K and 2L×M and predetermined values of $L_0$ and $M_0$ shall fall within the protection scope of this application.

It should also be understood that the foregoing uses two polarization directions merely as an example to list several possible ratios between K and 2L×M. The foregoing ratio between K and 2L×M may alternatively be adjusted to a ratio between K and L×M, a ratio between 2K' (where K'=K/2) and 2L×M, or the like. This is not limited in this application.

It should also be understood that, when a quantity of polarization directions is another value, corresponding adjustment may be performed on K and 2L×M. For example, when there is one polarization direction, the indicated ratio may be adjusted to the ratio between K and L×M.

As described above, the first mapping relationship group may be one of a plurality of preconfigured mapping relationship groups. The plurality of preconfigured mapping relationships may include, for example, one or more of Table 1 to Table 111 listed above, or a mapping relationship corresponding to one or more of Table 1 to Table 111 listed above.

Optionally, before operation 210, the method 200 further includes operation 220: The network device determines the first mapping relationship group from the plurality of mapping relationship groups.

Specifically, the first mapping relationship group may be determined based on one of the following:

a. a quantity of frequency domain units in transmission bandwidth of a CSI-RS;

b. a quantity of frequency domain units in bandwidth occupied by the first to-be-reported frequency domain unit to the last to-be-reported frequency domain unit in the transmission bandwidth of the CSI-RS; or c. a quantity of to-be-reported frequency domain units in the transmission bandwidth of the CSI-RS.

When it is defined in the protocol that a parameter used to determine the first mapping relationship group is one of a, b, or c listed above, the network device may determine the first mapping relationship group based on the parameter defined in the protocol. For ease of description, the parameter used to determine the first mapping relationship group is denoted as $N_3$ below. In this case, $N_3$ may be one of the foregoing a, b, or c, where $N_3$ is a positive integer.

Figure 4:
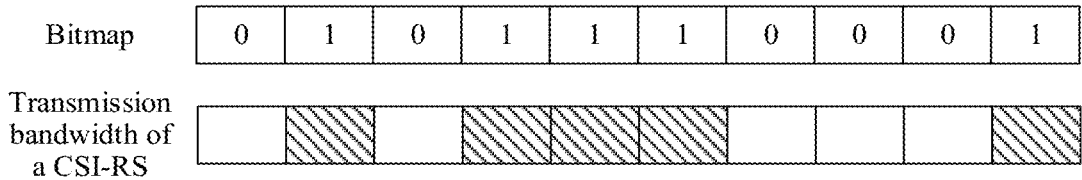
FIG. 4 is a schematic diagram of to-be-reported frequency domain units in transmission bandwidth of a CSI-RS according to an embodiment of this application.

For ease of understanding, FIG. 4 shows a schematic diagram of to-be-reported frequency domain units in transmission bandwidth of a CSI-RS. As shown in the figure, frequency-domain occupation bandwidth of the transmission bandwidth of the CSI-RS shown in FIG. 4 may include 10 frequency domain units. In other words, a quantity of frequency domain units corresponding to a is 10.

In the 10 frequency domain units, each shaded grid N represents a to-be-reported frequency domain unit. The transmission bandwidth of the CSI-RS shown in FIG. 4 includes a total of five to-be-reported frequency domain units. In other words, a quantity of frequency domain units corresponding to c is 5.

The bandwidth occupied by the first to-be-reported frequency domain unit to the last to-be-reported frequency domain unit in the transmission bandwidth of the CSI-RS includes a total of nine frequency domain units. In other words, a quantity of frequency domain units corresponding to b is 9.

It should be understood that illustration in the figure is merely an example, and should not constitute any limitation on this application. The quantity of frequency domain units included in the CSI-RS, a quantity of to-be-reported frequency domain units, a location of the to-be-reported frequency domain unit, and the like are not limited in this application.

In a possible implementation, one or more correspondences between $N_3$ and a mapping relationship group may be predefined in the protocol, or the network device and the terminal device may pre-agree on one or more correspondences between $N_3$ and a mapping relationship group. When determining a value of $N_3$, the network device may select, based on the correspondence between $N_3$ and a mapping relationship group, the first mapping relationship group that may be used for current channel sounding.

Specifically, a value range of $N_3$ may be divided into a plurality of intervals by using different thresholds, so that the plurality of intervals are in one-to-one correspondence with the plurality of mapping relationship groups. In this embodiment, the plurality of intervals for values of $N_3$ may be in one-to-one correspondence with some or all of the plurality of mapping relationship tables listed above.

For example, the value range of $N_3$ may be divided into two intervals by using a predefined threshold $N_{th1}$. Values of $N_3$ within a first interval satisfy $N_3 < N_{th1}$, and may be corresponding to a mapping relationship group in the plurality of mapping relationship groups listed above. Values of $N_3$ within a second interval satisfy $N_3 \geq N_{th1}$, and may be corresponding to another mapping relationship group in the plurality of mapping relationship groups listed above. The mapping relationship groups respectively corresponding to the two intervals are different. $N_{th1}$ is a positive integer.

For another example, the value range of $N_3$ may be divided into three intervals by using two predefined thresholds $N_{th2}$ and $N_{th3}$. Values of $N_3$ within a first interval satisfy $N_3 < N_{th2}$, and may be corresponding to a mapping relationship group in the plurality of mapping relationship groups listed above. Values of $N_3$ within a second interval satisfy $N_{th2} \leq N_3 < N_{th3}$, and may be corresponding to another mapping relationship group in the plurality of mapping relationship groups listed above. Values of $N_3$ within a third interval satisfy $N_3 \geq N_{th3}$, and may be corresponding to still another mapping relationship group in the plurality of mapping relationship groups listed above. The mapping relationship groups respectively corresponding to the three intervals are different from each other. $N_{th3} > N_{th2}$, and both $N_{th2}$ and $N_{th3}$ are positive integers.

Therefore, after configuring the transmission bandwidth of the CSI-RS and/or the to-be-reported frequency domain unit, the network device may select a corresponding first mapping relationship group based on the interval to which the value of $N_3$ belongs, to determine a first mapping relationship. After determining the first mapping relationship, the network device may indicate the first mapping relationship to the terminal device, so that the terminal device performs channel sounding and feedback based on a reporting quantity $L_0$ of spatial domain vectors and a reporting quantity $M_0$ of frequency domain vectors that are indicated in the first mapping relationship.

It should be understood that, that the network device preconfigures the plurality of mapping relationship groups and determines the first mapping relationship group from the plurality of mapping relationship groups is merely a possible implementation, and should not constitute any limitation on this application. The network device may alternatively preconfigure a mapping relationship group, and determine the first mapping relationship directly from the mapping relationship group.

In operation 230, the terminal device receives the indication of the first mapping relationship. Correspondingly, the network device sends the indication of the first mapping relationship.

The indication of the first mapping relationship may be carried in higher layer signaling. The higher layer signaling may be, for example, an RRC message or a MAC CE. The indication of the first mapping relationship may alternatively be carried in physical layer signaling. The physical layer signaling may be, for example, DCI. Specific signaling carrying the indication of the first mapping relationship is not limited in this application. The signaling carrying the indication of the first mapping relationship may be existing signaling, or may be newly added signaling.

As described above, the indication of the first mapping relationship may be the first mapping relationship, or may be information that can be used to determine the first mapping relationship, such as an index of the first mapping relationship.

The terminal device may prestore the first mapping relationship group; and may determine the first mapping relationship based on the first mapping relationship group when receiving the indication of the first mapping relationship from the network device. For example, when receiving the index of the first mapping relationship, the terminal device may determine the first mapping relationship from the first mapping relationship group.

In operation 240, the terminal device determines the reporting quantity $L_0$ of spatial domain vectors and the reporting quantity $M_0$ of frequency domain vectors based on the first mapping relationship.

After determining the first mapping relationship, the terminal device may determine the reporting quantity $L_0$ of spatial domain vectors and the reporting quantity $M_0$ of frequency domain vectors. Then, the terminal device may perform channel sounding based on the value of $L_0$ and the value of $M_0$, to determine $L_0$ spatial domain vectors and $M_0$ frequency domain vectors.

The terminal device may perform channel sounding by using an existing estimation algorithm, for example, DFT, a multiple signal classification algorithm (MUSIC), a Bartlett algorithm, or an estimation of signal parameters via rotation invariant technique algorithm (ESPRIT). These algorithms are not described by using examples. For brevity, detailed descriptions of the specific process thereof are omitted herein.

Because the first mapping relationship group may be selected from the plurality of preconfigured mapping relationship groups, the terminal device may first determine the first mapping relationship group before performing operation 240.

Optionally, the method 200 further includes operation 250: The terminal device determines the first mapping relationship group from the plurality of mapping relationship groups.

Specifically, the first mapping relationship group may be determined based on one of the following:

a. the quantity of frequency domain units in the transmission bandwidth of the CSI-RS;

b. the quantity of frequency domain units in the bandwidth occupied by the first to-be-reported frequency domain unit to the last to-be-reported frequency domain unit in the transmission bandwidth of the CSI-RS; or c. the quantity of to-be-reported frequency domain units in the transmission bandwidth of the CSI-RS.

The foregoing a, b, and c have been detailed in operation 220 with reference the accompany drawings. For brevity, details are not described herein again.

The terminal device may determine the to-be-reported frequency domain unit in the transmission bandwidth of the CSI-RS based on the signaling of the network device. Optionally, the method 200 further includes: The terminal device receives second indication information, where the second indication information is used to indicate a quantity of to-be-reported frequency domain units and a location of the to-be-reported frequency domain unit. Correspondingly, the network device sends the second indication information.

In a possible design, the second indication information may be CSI reporting bandwidth (csi-ReportingBand) in an information element (IE) CSI report configuration (CSI-ReportConfig). In other words, the network device may indicate a to-be-reported subband (that is, an example of a frequency domain unit) by using csi-ReportingBand. csi-ReportingBand may specifically be a bitmap. A length of the bitmap may be equal to a quantity of subbands included in the transmission bandwidth of the CSI-RS. Each indicator bit in the bitmap may be corresponding to one subband in the transmission bandwidth of the CSI-RS. Each indicator bit is used to indicate whether CSI of a corresponding subband needs to be reported. For example, when an indicator bit is set to "1", CSI of a corresponding subband needs to be reported; when an indicator bit is set to "0", CSI of a corresponding subband does not need to be reported. FIG. 4 shows an example of a correspondence between each indicator bit in the bitmap and a subband. It should be understood that meanings expressed by values of the indicator bit that are listed above and in FIG. 4 are merely examples, and should not constitute any limitation on this application.

It should be understood that the foregoing signaling used for indicating the quantity of to-be-reported frequency domain units and the location of the to-be-reported frequency domain unit is merely an example, and should not constitute any limitation on this application. Specific signaling used for indicating the quantity of to-be-reported frequency domain units and the location of the to-be-reported frequency domain unit is not limited in this application.

It should be noted that the to-be-reported frequency domain unit indicated by using the second indication information may be a frequency domain unit on a per subband basis. A frequency domain unit based on which the terminal device feeds back a PMI may be a frequency domain unit on a per subband basis, or may be a frequency domain unit at another granularity. This is not limited in this application. When a granularity of the frequency domain unit based on which the terminal device feeds back the PMI is different from that of the to-be-reported frequency domain unit indicated by using the second indication information, the value of $N_3$ can still be calculated based on the granularity of the to-be-reported frequency domain unit indicated by using the second indication information.

In addition, a specific process of performing operation 250 by the terminal device is similar to that of performing operation 220 by the network device. For brevity, details are not described herein again.

Optionally, the method 200 further includes: The terminal device determines, based on the reporting quantity $L_0$ of spatial domain vectors and the reporting quantity $M_0$ of frequency domain vectors, the quantity $K_0$ of space-frequency vector pairs used to construct the precoding vector.

As described above, the precoding vector may be determined based on some or all of the L×M space-frequency vector pairs constructed by using the L spatial domain vectors and the M frequency domain vectors. Therefore, in this embodiment of this application, the terminal device unnecessarily feeds back $L_0 \times M_0$ weighting coefficients based on $L_0 \times M_0$ space-frequency vector pairs constructed by using the $L_0$ spatial domain vectors and the $M_0$ frequency domain vectors, but may feed back weighting coefficients for some of the $L_0 \times M_0$ space-frequency vector pairs. Therefore, a reporting quantity of weighting coefficients may be considered as a quantity of space-frequency vector pairs used to construct the precoding vector.

In this embodiment of this application, the reporting quantity of weighting coefficients may alternatively be preconfigured, or in other words, the quantity of space-frequency vector pairs used to construct the precoding vector may be preconfigured. For ease of description, the reporting quantity of weighting coefficients (or the quantity of space-frequency vector pairs used to construct the precoding vector) that is determined by the terminal device based on the value of $L_0$ and the value of $M_0$ may be denoted as $K_0$, where $K_0 \leq 2L_0 \times M_0$, and $K_0$ is a positive integer. It can be understood that $K_0$ is one of a plurality of values of K determined based on a plurality of combinations of the values of L and the values of M in the foregoing first mapping relationship group.

In a possible design, a ratio between $K_0$ and $2L_0 \times M_0$ is a preset value. For example, the ratio between $K_0$ and $2L_0 \times M_0$ may be a fixed value, or may be configured by the network device.

In an embodiment, the ratio between $K_0$ and $2L_0 \times M_0$ is a fixed value.

In another embodiment, the ratio between $K_0$ and $2L_0 \times M_0$ is indicated by the network device.

It should be understood that the ratio between $K_0$ and $2L_0 \times M_0$ is similar to the ratio between K and 2L×M in operation 210. For brevity, details are not described herein again.

When it is defined in the protocol that one of the foregoing designs is used for the ratio between $K_0$ and $2L_0 \times M_0$, the terminal device may determine the value of $K_0$ based on the corresponding ratio and the predetermined values of $L_0$ and $M_0$.

It should also be understood that $K_0$ represents the reporting quantity of weighting coefficients, but it does not mean that the terminal device definitely reports $K_0$ weighting coefficients. A quantity of weighting coefficients actually reported by the terminal device may be less than or equal to $K_0$. For example, when there are two polarization directions, in $2L_0 \times M_0$ space-frequency vector pairs that are corresponding to the two polarization directions and that are constructed by using the $L_0$ spatial domain vectors and the $M_0$ frequency domain vectors, there may be a plurality of (for example, greater than $2L_0 \times M_0 - K_0$) space-frequency vector pairs whose amplitude quantized values of weighting coefficients are 0. The terminal device may not report a weighting coefficient with an amplitude quantized value 0. For another example, when there is one polarization direction, in the $L_0 \times M_0$ space-frequency vector pairs constructed by using the $L_0$ spatial domain vectors and the $M_0$ frequency domain vectors, there may be a plurality of (for example, greater than $L_0 \times M_0 - K_0$) space-frequency vector pairs whose amplitude quantized values of weighting coefficients are 0. The terminal device may not report a weighting coefficient with an amplitude quantized value 0.

However, it can be understood that, the terminal device may indicate a correspondence between a weighting coefficient and a space-frequency vector pair by indicating a location of a selected space-frequency vector pair. For example, the selected space-frequency vector pair in the $L_0 \times M_0$ space-frequency vector pairs is indicated by using the bitmap, as described above.

Actually, the foregoing first mapping relationship group may be extended as a correspondence between a reporting quantity L of spatial domain vectors, a reporting quantity M of frequency domain vectors, and a reporting quantity K of weighting coefficients based on the ratio between K and 2L×M.

Optionally, the first mapping relationship group is used to indicate the correspondence between the reporting quantity L of spatial domain vectors, the reporting quantity M of frequency domain vectors, and the reporting quantity K of weighting coefficients.

The foregoing several first mapping relationship groups are used as examples.

If the ratio between K and 2L×M is a fixed value, the foregoing first mapping relationship group may further be extended as a mapping relationship between a value of L, a value of M, and a value of K. The first mapping relationship groups listed in Table 1 and Table 44 are used as examples. If the ratio between K and 2L×M is 1/2, based on the combinations of the values of L and the values of M listed in Table 1, corresponding values of K may further be determined, as listed Table 1-1:

TABLE 1-1

| Index | Parameter | | |
|---|---|---|---|
| | L | M | K |
| 0 | 2 | 3 | 6 |
| 1 | 3 | 3 | 9 |
| 2 | 4 | 3 | 12 |
| 3 | 4 | 4 | 16 |

If the ratio between K and 2L×M is 1/2, based on the combinations of the values of L and the values of M listed in Table 44, corresponding values of K may further be determined, as listed Table 44-1:

TABLE 44-1

| Index | Parameter | | |
|---|---|---|---|
| | L | M | K |
| 0 | 2 | 4 | 8 |
| 1 | 4 | 4 | 16 |
| 2 | 6 | 4 | 24 |
| 3 | 6 | 6 | 36 |

Based on the same manner, the foregoing tables may further be extended to obtain correspondences between values of L, values of M, and values of K. For brevity, details are not described herein.

It should be understood that all the mapping relationships between the values of L, the values of M, and the values of K that are obtained by performing further extension on the foregoing Table 1 to Table 111 based on different ratios between K and 2L×M shall fall within the protection scope of this application.

If the ratio between K and 2L×M is configured by the network device and a value of the ratio may be 1/2 or 1/4, the foregoing first mapping relationship group may further be extended as a mapping relationship between a value of L, a value of M, and a value of K. The first mapping relationship group listed in Table 99 is used as an example. If the ratio between K and 2L×M is 1/4 or 1/2, based on the combinations of the values of L and the values of M listed in Table 99, corresponding values of K may further be determined, as listed Table 99-1 or Table 99-2:

TABLE 99-1

| | Parameter | | |
|---|---|---|---|
| Index | L | M | K |
| 0 | 2 | 4 | 8 |
| 1 | 4 | 4 | 16 |
| 2 | 6 | 6 | 36 |

TABLE 99-2

| | Parameter | | |
|---|---|---|---|
| Index | L | M | K |
| 0 | 2 | 4 | 4 |
| 1 | 4 | 4 | 8 |
| 2 | 6 | 6 | 18 |

Based on the same manner, the foregoing tables may further be extended to obtain correspondences between values of L, values of M, and values of K. For brevity, details are not described herein.

It should be understood that all the mapping relationships between the values of L, the values of M, and the values of K that are obtained by performing further extension on the foregoing Table 1 to Table 111 based on different ratios between K and 2L×M shall fall within the protection scope of this application.

In this case, the terminal device may directly determine the value of $L_0$, the value of $M_0$, and the value of $K_0$ based on the indication of the first mapping relationship sent by the network device.

The foregoing two possible forms (that is, the correspondence between the value of L and the value of M, and the correspondence between the value of L, the value of M, and the value of K) of the first mapping relationship group are merely examples, and should not constitute any limitation on this application. In addition, representing the mapping relationships by using the tables is merely a possible implementation, and should not constitute any limitation on this application.

Therefore, in this embodiment of this application, a plurality of possible correspondences between values of L and values of M are predefined, to narrow down selection ranges of the reporting quantities. This is conducive to reducing a calculation amount for determining the value of L and the value of M by the network device. Moreover, by narrowing down the selection ranges of the reporting quantities, a quantity of combinations that include the values of L and the values of M and that may be included in the first mapping relationship group can be reduced, and therefore the network device can indicate the first mapping relationship in the first mapping relationship group by using fewer bits. This is conducive to reducing indication overheads of the network device. Furthermore, different feedback precision requirements are taken into account for the plurality of combinations that include the values of L and the values of M and that are defined in this embodiment of this application. When feedback overheads are the same as or approximate to each other, a combination of a value of L and a value of M with better performance is retained as much as possible. In this way, feedback overheads and feedback precision are considered comprehensively, thereby improving performance of a communications system.

Figure 5:
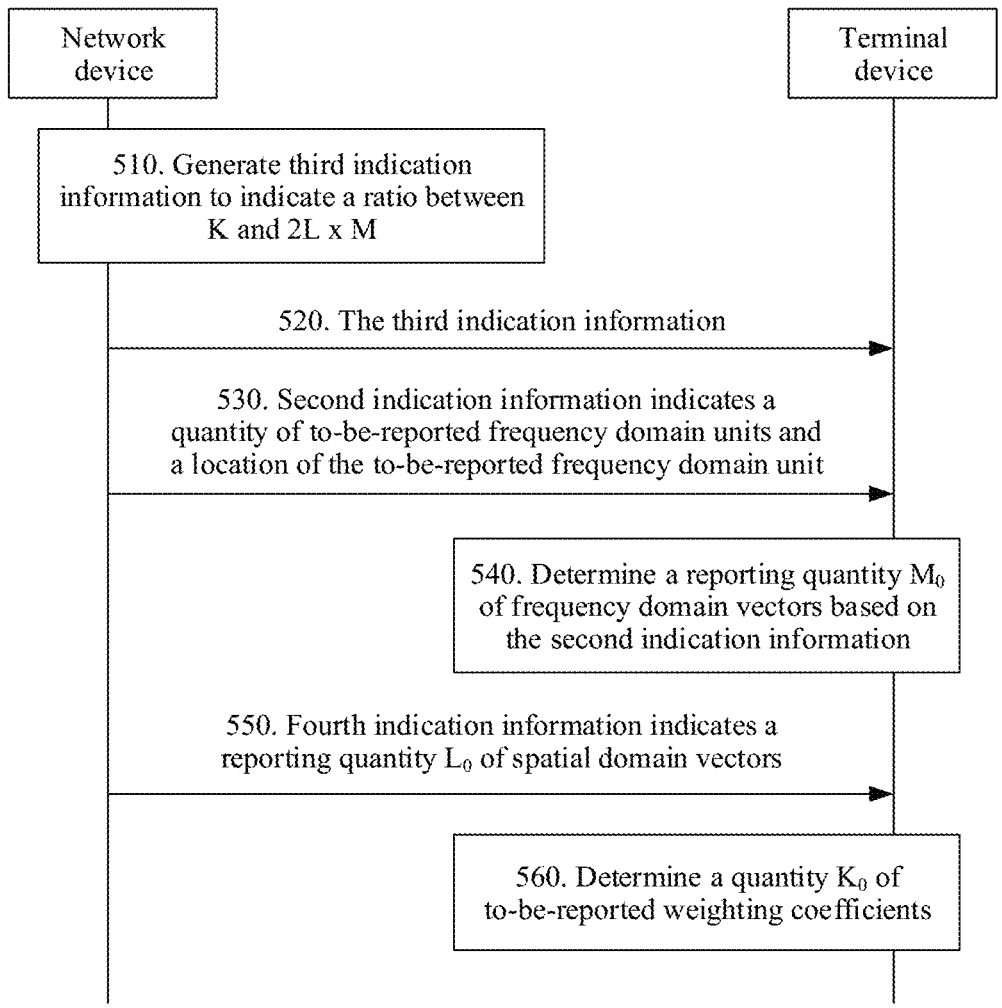
FIG. 5 is a schematic flowchart of a parameter configuration method according to another embodiment of this application.

With reference to the accompanying drawings, the foregoing details the parameter configuration method provided in this embodiment of this application. However, this should not constitute any limitation on this application. This application further provides a parameter configuration method. The method may be used for preconfiguring a correspondence between $N_4$ ($N_4$ is a positive integer, and a specific meaning of $N_4$ is detailed below) and a reporting quantity M of frequency domain vectors and a correspondence between $N_4$, L, and K. With reference to FIG. 5, the following details the parameter configuration method provided in another embodiment of this application.

FIG. 5 is a schematic flowchart of a parameter configuration method described from a perspective of interaction between devices according to another embodiment of this application. As shown in the figure, the method 500 may include operation 510 to operation 560. The following details the operations in the method 500.

In operation 510, a network device generates third indication information, where the third indication information is used to indicate a ratio between a reporting quantity $K_0$ of weighting coefficients and a quantity $2L_0 \times M_0$ of space-frequency vector pairs in two polarization directions.

Specifically, the $2L_0 \times M_0$ space-frequency vector pairs may include $L_0 \times M_0$ space-frequency vector pairs corresponding to a first polarization direction and $L_0 \times M_0$ space-frequency vector pairs corresponding to a second polarization direction. Same $L_0 \times M_0$ space-frequency vector pairs may be shared for the two polarization directions. To be specific, $L_0 \times M_0$ space-frequency vector pairs corresponding to the first polarization direction may be the same as $L_0 \times M_0$ space-frequency vector pairs corresponding to the second polarization direction. Alternatively, separate $L_0 \times M_0$ space-frequency vector pairs may be used for each of the two polarization directions. To be specific, $L_0 \times M_0$ space-frequency vector pairs corresponding to the first polarization direction may be completely different from or may be partially or completely the same as $L_0 \times M_0$ space-frequency vector pairs corresponding to the second polarization direction. This is not limited in this application.

The following lists several possible values of a ratio between K and 2L×M. It should be understood that the following possible values of the ratio between K and 2L×M may be approximate values. It can be understood that $K_0$ is one of a plurality of values of K, $L_0$ is one of a plurality of values of L, and $M_0$ is one of a plurality of values of M. Therefore, the ratio between $K_0$ and $2L_0 \times M_0$ in this embodiment of this application may be one of the following several possible values of the ratio between K and 2L×M.

Optionally, the ratio between K and 2L×M is 1/2 or 1.

In other words, K is equal to L×M, or K is equal to 2L×M.

Optionally, the ratio between K and 2L×M is 1/4, 1/2, or 3/4.

Specifically, that the ratio between K and 2L×M is 1/4, 1/2, or 3/4 may mean that the ratio between K and 2L×M is equal to 1/4, 1/2, or 3/4 or is approximately equal to 1/4, 1/2, or 3/4. To be specific, K=⌈L×M/2⌉, K=⌊L×M/2⌋, K=[L×M/2], K=L×M, K=⌊3L×M/2⌋, K=⌈3L×M/2⌉, or K=[3L×M/2] holds true.

Optionally, the ratio between K and 2L×M is 1/4, 1/2, 3/4, or 1.

Specifically, that the ratio between K and 2L×M is 1/4, 1/2, 3/4, or 1 may mean that the ratio between K and 2L×M is equal to 1/4, 1/2, 3/4, or 1 or is approximately equal to 1/4, 1/2, 3/4, or 1. To be specific, K=⌈L×M/2⌉, K=⌊L×M/2⌋, K=[L×M/2], K=L×M, K=⌊3L×M/2⌋, K=⌈3L×M/2⌉, K=[3L×M/2], or K=2L×M holds true.

Optionally, the ratio between K and 2L×M is 1/3 or 2/3.

Specifically, that the ratio between K and 2L×M is 1/3 or 2/3 may mean that the ratio between K and 2L×M is equal to 1/3 or 2/3 or is approximately equal to 1/3 or 2/3. To be specific, K=⌈2L×M/3⌉, K=⌊2L×M/3⌋, K=[2L×M/3], K=⌊4L×M/3⌋, or K=[4L×M/3] holds true.

Optionally, the ratio between K and 2L×M is 1/3, 2/3, or 1.

Specifically, that the ratio between K and 2L×M is 1/3, 2/3, or 1 may mean that the ratio between K and 2L×M is equal to 1/3, 2/3, or 1 or is approximately equal to 1/3, 2/3, or 1. To be specific, K=⌈2L×M/3⌉, K=⌊2L×M/3⌋, K=[2L×M/3], K=⌈4L×M/3⌉, K=⌊4L×M/3⌋, K=[4L×M/3], or K=2L×M holds true.

⌈ ⌉ represents rounding up to the nearest integer, ⌊ ⌋ represents rounding down to the nearest integer, and [ ] represents rounding to the nearest integer. After rounding is performed in a specific manner defined in a protocol, the network device and a terminal device may determine a value of K in a same manner.

It should be understood that the foregoing ratios between K and 2L×M are merely examples, and should not constitute any limitation on this application. A specific value of the ratio between K and 2L×M is not limited in this application.

It should also be understood that the foregoing uses two polarization directions merely as an example to list several possible ratios between K and 2L×M. The foregoing ratio between K and 2L×M may alternatively be adjusted to a ratio between K and L×M, a ratio between 2K' (where K'=K/2) and 2L×M, or the like. This is not limited in this application.

It should also be understood that, when a quantity of polarization directions is another value, corresponding adjustment may be performed on K and 2L×M. For example, when there is one polarization direction, the indicated ratio may be adjusted to the ratio between K and L×M.

In operation 520, the network device sends the third indication information. Correspondingly, the terminal device receives the third indication information.

The third indication information may be carried in higher layer signaling. The higher layer signaling may be, for example, an RRC message or a MAC CE. The third indication information may alternatively be carried in physical layer signaling. The physical layer signaling may be, for example, DCI. Specific signaling carrying the third indication information is not limited in this application. The signaling carrying the third indication information may be existing signaling, or may be newly added signaling.

In operation 530, the network device sends second indication information, where the second indication information is used to indicate a quantity of to-be-reported frequency domain units and a location of the to-be-reported frequency domain unit.

In the foregoing method 200, specific methods for sending the second indication information by the network device and indicating the quantity of to-be-reported frequency domain units and the location of the to-be-reported frequency domain unit by using the second indication information have been detailed. For brevity, details are not described herein again.

In this embodiment of this application, the reporting quantity of frequency domain vectors may be related to the quantity of to-be-reported frequency domain units, or may be related to a quantity of frequency domain units in transmission bandwidth of a CSI-RS.

Specifically, the reporting quantity M of frequency domain vectors may be determined based on one of the following:

a. the quantity of frequency domain units in the transmission bandwidth of the CSI-RS;

b. a quantity of frequency domain units in bandwidth occupied by the first to-be-reported frequency domain unit to the last to-be-reported frequency domain unit in the transmission bandwidth of the CSI-RS; or c. a quantity of to-be-reported frequency domain units in the transmission bandwidth of the CSI-RS.

The foregoing a, b, and c have been detailed in operation 220 in the foregoing method 200 with reference the accompany drawings. For brevity, details are not described herein again.

When it is defined in the protocol that a parameter used to determine the reporting quantity of frequency domain vectors is one of a, b, or c listed above, the network device may determine the first mapping relationship group based on the parameter defined in the protocol. For ease of description, the parameter used to determine the reporting quantity of frequency domain vectors is denoted as $N_4$ below. In this case, $N_4$ may be one of the foregoing a, b, or c. It should be understood that $N_4$ and $N_3$ in the foregoing method 200 may express a same meaning, or may express different meanings. This is not limited in this application.

In operation 540, the terminal device determines a reporting quantity $M_0$ of frequency domain vectors based on the second indication information.

Specifically, one or more correspondences between $N_4$ and a reporting quantity of frequency domain vectors may be predefined in the protocol, or the network device and the terminal device may pre-agree on one or more correspondences between $N_4$ and a reporting quantity of frequency domain vectors. When determining a value of $N_4$, the network device may select the reporting quantity $M_0$ of frequency domain vectors based on the correspondence between $N_4$ and a mapping relationship group.

Specifically, a value range of $N_4$ may be divided into a plurality of intervals by using different thresholds, so that the plurality of intervals are in one-to-one correspondence with a plurality of mapping relationship groups. In this embodiment, the plurality of intervals for values of $N_4$ may be in one-to-one correspondence with some or all of the plurality of mapping relationship tables listed above.

For example, the value range of $N_4$ may be divided into two intervals by using a predefined threshold $N_{th4}$. Values of $N_4$ within a first interval satisfy $N_4 < N_{th4}$, and may be corresponding to one of a plurality of values of M listed above. Values of $N_4$ within a second interval satisfy $N_4 \geq N_{th4}$, and may be corresponding to another value in the plurality of values of M listed above. The values of M respectively corresponding to the two intervals are different. $N_{th4}$ is a positive integer.

For another example, the value range of $N_4$ may be divided into three intervals by using two predefined thresholds $N_{th5}$ and $N_{th6}$. Values of $N_4$ within a first interval satisfy $N_4 < N_{th5}$, and may be corresponding to one of a plurality of values of M listed above. Values of $N_4$ within a second interval satisfy $N_{th5} \leq N_4 < N_{th6}$, and may be corresponding to another value in the plurality of values of M listed above. Values of $N_4$ within a third interval satisfy $N_4 \geq N_{th6}$, and may be corresponding to one of the plurality of values of M listed above. The values of M respectively corresponding to the three intervals are different from each other. $N_{th6} > N_{th5}$, and both $N_{th5}$ and $N_{th6}$ are positive integers.

Therefore, after receiving the second indication information, the terminal device may determine the reporting quantity $M_0$ of frequency domain vectors based on the interval to which the value of $N_4$ belongs.

In operation 540, the terminal device determines the reporting quantity $M_0$ of frequency domain vectors based on the second indication information.

In operation 550, the network device sends fourth indication information, where the fourth indication information is used to indicate a reporting quantity $L_0$ of spatial domain vectors. Correspondingly, the terminal device receives the fourth indication information.

Specifically, the fourth indication information and signaling that is used to indicate the reporting quantity $L_0$ of spatial domain vectors and that is defined in a type-II codebook may be same signaling, or the fourth indication information may be other newly added signaling. This is not limited in this application. For example, the fourth indication information may be carried in higher layer signaling. The higher layer signaling may be, for example, an RRC message or a MAC CE. The fourth indication information may alternatively be carried in physical layer signaling. The physical layer signaling may be, for example, DCI. Specific signaling carrying the fourth indication information is not limited in this application. The signaling carrying the fourth indication information may be existing signaling, or may be newly added signaling.

Optionally, the reporting quantity L of spatial domain vectors may be 2, 3, or 4.

Optionally, the reporting quantity L of spatial domain vectors may be 2, 3, 4, or 6.

In this embodiment of this application, a value of $L_0$ indicated by using the fourth indication information may be one of the plurality of possible values of L listed above.

It should be understood that the foregoing reporting quantities of spatial domain vectors are merely examples, and should not constitute any limitation on this application. A specific value of the reporting quantity of spatial domain vectors is not limited in this application.

In operation 560, the terminal device determines the reporting quantity $K_0$ of weighting coefficients based on the ratio between $K_0$ and $2L_0 \times M_0$, the reporting quantity $M_0$ of frequency domain vectors, and the reporting quantity $L_0$ of spatial domain vectors.

After receiving the second indication information and the fourth indication information, the terminal device may separately determine the reporting quantity $M_0$ of frequency domain vectors and the reporting quantity $L_0$ of spatial domain vectors; and then may determine the reporting quantity $K_0$ of weighting coefficients based on the ratio between the K and $2L \times M$ indicated by using the third indication information.

It should be understood that the foregoing third indication information and fourth indication information may be carried in same signaling, or may be carried in different signaling. This is not limited in this application.

Therefore, in this embodiment of this application, a plurality of possible correspondences between values of $N_4$ and values of M, and a plurality of possible ratios between K and $2L \times M$ are predefined, to narrow down selection ranges of the reporting quantities. This is conducive to reducing a calculation amount for determining the value of L, the value of M, and the value of K by the network device. Moreover, by narrowing down the selection ranges of the reporting quantities, a quantity of combinations that include the values of L, the values of M, and the values of K and that may be included in the first mapping relationship group can be reduced, and therefore the network device can indicate a first mapping relationship in the first mapping relationship group by using fewer bits. This is conducive to reducing indication overheads of the network device. Furthermore, the quantity of to-be-reported frequency domain units is taken into account for the plurality of combinations that include the values of $N_4$ and the values of M and that are defined in this embodiment of this application. Different reporting quantities of frequency domain vectors are configured specific to different quantities of to-be-reported frequency domain units, to obtain relatively high feedback precision. In addition, a combination of a value of L and a value of M with better performance is retained as much as possible. In this way, feedback overheads and feedback precision are considered comprehensively, thereby improving performance of a communications system.

Figure 6:
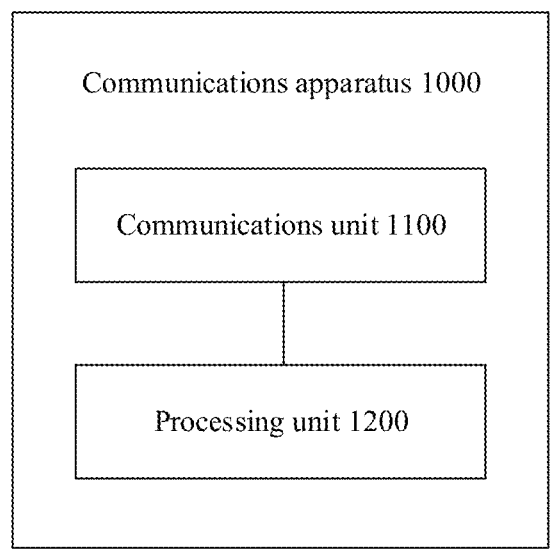
FIG. 6 is a schematic block diagram of a communications apparatus according to an embodiment of this application.
Figure 7:
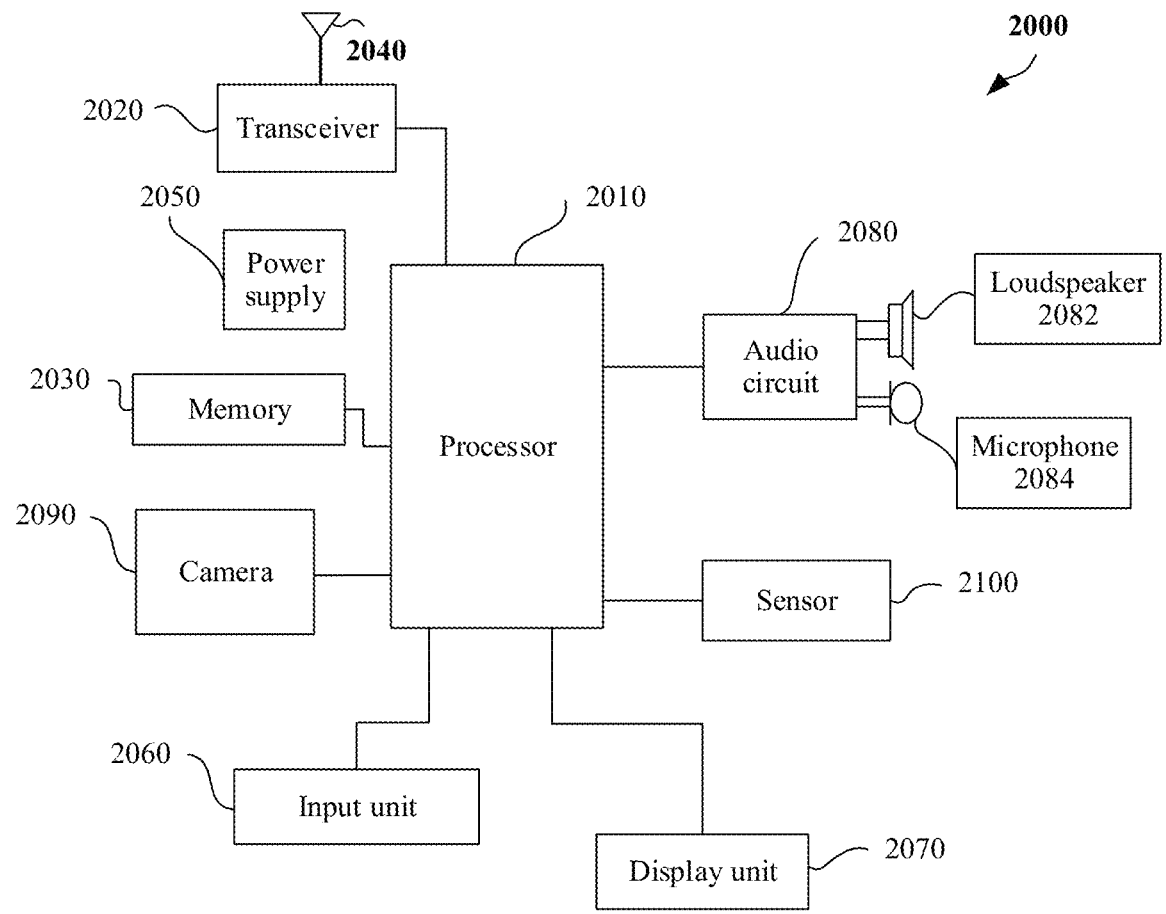
FIG. 7 is a schematic structural diagram of a terminal device according to an embodiment of this application.
Figure 8:
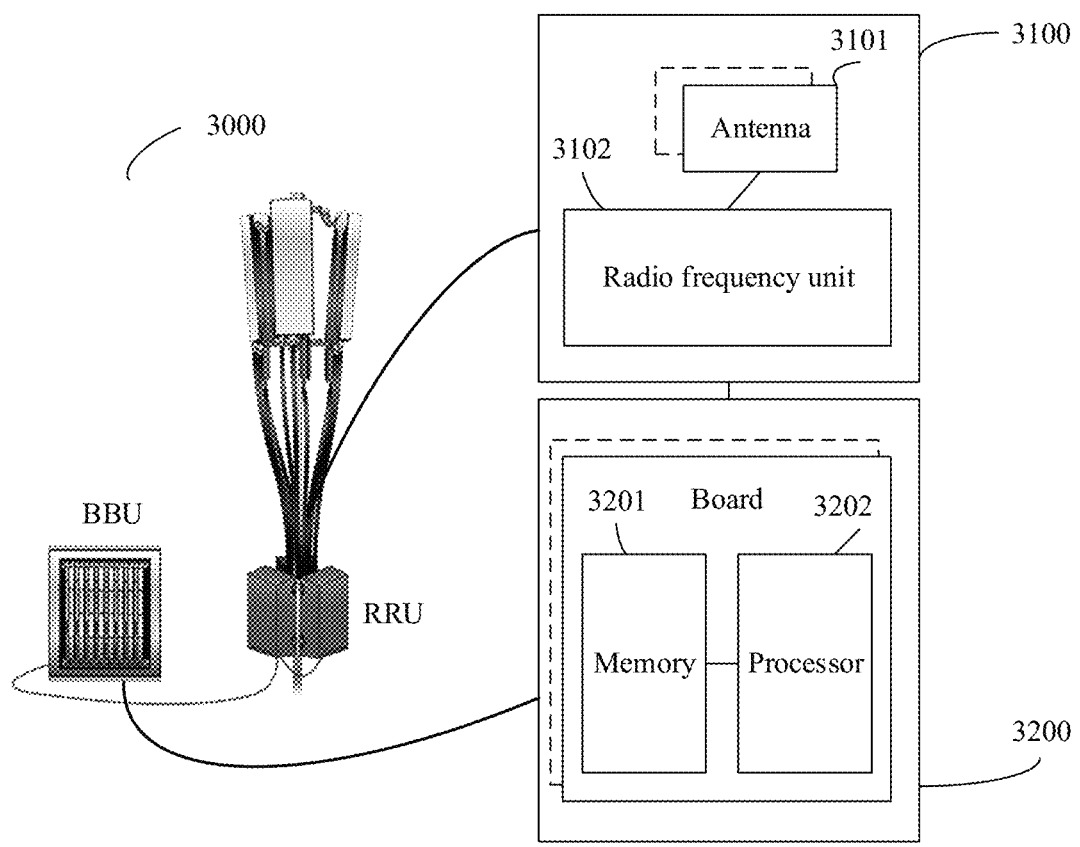
FIG. 8 is a schematic structural diagram of a network device according to an embodiment of this application.

It should be understood that sequence numbers of the processes do not mean execution sequences in the foregoing embodiments. The execution sequences of the processes should be determined according to functions and internal logic of the processes, and should not be construed as any limitation on the implementation processes of the embodiments of this application. With reference to FIG. 2 to FIG. 5, the foregoing details the parameter indication methods provided in the embodiments of this application. With reference to FIG. 6 to FIG. 8, the following details a communications apparatus provided in the embodiments of this application.

FIG. 6 is a schematic block diagram of a communications apparatus according to an embodiment of this application. As shown in the figure, the communications apparatus 1000 may include a communications unit 1100 and a processing unit 1200.

In a possible design, the communications apparatus 1000 may be corresponding to the terminal devices in the foregoing method embodiments. For example, the communications apparatus 1000 may be a terminal device, or a chip configured in the terminal device.

Specifically, the communications apparatus 1000 may be corresponding to the terminal device in the method 200 or the method 500 according to the embodiments of this application. The communications apparatus 1000 may include units configured to perform the method performed by the terminal device in the method 200 in FIG. 2 or in the method 500 in FIG. 5. In addition, the units in the communications apparatus 1000 and the foregoing other operations and/or functions are used to implement corresponding procedures in the method 200 in FIG. 2 or in the method 500 in FIG. 5.

When the communications apparatus 1000 is configured to perform the method 200 in FIG. 2, the communications unit 1100 may be configured to perform operation 230 in the method 200, and the processing unit 1200 may be configured to perform operation 240 and operation 250 in the method 200. It should be understood that specific processes of performing the corresponding operations by the units have been detailed in the foregoing method embodiment. For brevity, details are not described herein again.

When the communications apparatus 1000 is configured to perform the method 500 in FIG. 5, the communications unit 1100 may be configured to perform operation 520, operation 530, and operation 550 in the method 500, and the processing unit 1200 may be configured to perform operation 540 and operation 560 in the method 500. It should be understood that specific processes of performing the corresponding operations by the units have been detailed in the foregoing method embodiment. For brevity, details are not described herein again.

It should also be understood that, when the communications apparatus 1000 is a terminal device, the communications unit 1100 in the communications apparatus 1000 may be corresponding to a transceiver 2020 in a terminal device 2000 shown in FIG. 7, and the processing unit 1200 in the communications apparatus 1000 may be corresponding to a processor 2010 in the terminal device 2000 shown in FIG. 7.

It should also be understood that, when the communications apparatus 1000 is a chip configured in the terminal device, the communications unit 1100 in the communications apparatus 1000 may be an input/output interface.

In another possible design, the communications apparatus 1000 may be corresponding to the network devices in the foregoing method embodiments. For example, the communications apparatus 1000 may be a network device, or a chip configured in the network device.

Specifically, the communications apparatus 1000 may be corresponding to the network device in the method 200 or the method 500 according to the embodiments of this application. The communications apparatus 1000 may include units configured to perform the method performed by the network device in the method 200 in FIG. 2 or in the method 500 in FIG. 5. In addition, the units in the communications apparatus 1000 and the foregoing other operations and/or functions are used to implement corresponding procedures in the method 200 in FIG. 2 or in the method 500 in FIG. 5.

When the communications apparatus 1000 is configured to perform the method 200 in FIG. 2, the communications unit 1100 may be configured to perform operation 230 in the method 200, and the processing unit 1200 may be configured to perform operation 210 and operation 220 in the method 200. It should be understood that specific processes of performing the corresponding operations by the units have been detailed in the foregoing method embodiment. For brevity, details are not described herein again.

When the communications apparatus 1000 is configured to perform the method 500 in FIG. 5, the communications unit 1100 may be configured to perform operation 520, operation 530, and operation 550 in the method 500, and the processing unit 1200 may be configured to perform operation 510 in the method 500. It should be understood that specific processes of performing the corresponding operations by the units have been detailed in the foregoing method embodiment. For brevity, details are not described herein again.

It should also be understood that, when the communications apparatus 1000 is a network device, the communications unit 1100 in the communications apparatus 1000 may be corresponding to a transceiver 3200 in a network device 3000 shown in FIG. 8, and the processing unit 1200 in the communications apparatus 1000 may be corresponding to a processor 3100 in the network device 3000 shown in FIG. 8.

It should also be understood that, when the communications apparatus 1000 is a chip configured in the network device, the communications unit 1100 in the communications apparatus 1000 may be an input/output interface.

FIG. 7 is a schematic structural diagram of a terminal device 2000 according to an embodiment of this application. The terminal device 2000 can be applied to the system shown in FIG. 1, and performs functions of the terminal devices in the foregoing method embodiments. As shown in the figure, the terminal device 2000 includes a processor 2010 and a transceiver 2020. Optionally, the terminal device 2000 further includes a memory 2030. The processor 2010, the transceiver 2002, and the memory 2030 may communicate with each other by using an internal connection path, to transfer a control and/or data signal. The memory 2030 is configured to store a computer program. The processor 2010 is configured to invoke the computer program from the memory 2030 and run the computer program, to control the transceiver 2020 to receive/send signals. Optionally, the terminal device 2000 may further include an antenna 2040, configured to send, by using a wireless signal, uplink data or uplink control signaling that is output by the transceiver 2020.

The processor 2010 and the memory 2030 may be combined into a processing apparatus, and the processor 2010 is configured to execute program code stored in the memory 2030, to implement the foregoing function. During specific implementation, the memory 2030 may be integrated with the processor 2010, or may be independent of the processor 2010. The processor 2010 may be corresponding to the processing unit in FIG. 6.

The transceiver 2020 may be corresponding to the communications unit in FIG. 6, and may also be referred to as a transceiver unit. The transceiver 2020 may include a receiver (or referred to as a receiver circuit) and a transmitter (or referred to as a transmitter circuit). The receiver is configured to receive a signal, and the transmitter is configured to transmit a signal.

It should be understood that the terminal device 2000 shown in FIG. 7 can implement various processes related to the terminal device in the method embodiment shown in FIG. 2 or FIG. 5. Operations and/or functions of various modules in the terminal device 2000 are used to implement corresponding procedures in the foregoing method embodiments. For details, refer to the descriptions in the foregoing method embodiments. To avoid repetition, detailed descriptions are omitted properly herein.

The processor 2010 may be configured to perform actions that are implemented inside the terminal device and that are described in the foregoing method embodiments. The transceiver 2020 may be configured to perform actions, described in the foregoing method embodiments, of sending information by the terminal device to the network device or receiving information by the terminal device from the network device. For details, refer to the descriptions in the foregoing method embodiments. Details are not described herein again.

Optionally, the terminal device 2000 may further include a power supply 2050, configured to supply power to components or circuits in the terminal device.

In addition, to further improve the functions of the terminal device, the terminal device 2000 may further include one or more of an input unit 2060, a display unit 2070, an audio circuit 2080, a camera 2090, and a sensor 2100. The audio circuit may further include a loudspeaker 2082, a microphone 2084, and the like.

FIG. 8 is a schematic structural diagram of a network device according to an embodiment of this application, for example, may be a schematic structural diagram of a base station. The base station 3000 can be applied to the system shown in FIG. 1, and performs functions of the network devices in the foregoing method embodiments. As shown in the figure, the base station 3000 may include one or more radio units such as a remote radio unit (RRU) 3100, and one or more baseband units (BBU) (the baseband unit may also be referred to as a distributed unit (DU)) 3200. The RRU 3100 may be referred to as a transceiver unit, and is corresponding to the communications unit 1100 in FIG. 6. Optionally, the transceiver unit 3100 may also be referred to as a transceiver, a transceiver circuit, or the like, and may include at least one antenna 3101 and a radio unit 3102. Optionally, the transceiver unit 3100 may include a receiving unit and a sending unit, where the receiving unit may be corresponding to a receiver (or referred to as a receiver circuit), and the sending unit may be corresponding to a transmitter (or referred to as a transmitter circuit). The part RRU 3100 is mainly configured to receive/send a radio frequency signal and perform conversion between a radio frequency signal and a baseband signal, for example, configured to send indication information to a terminal device. The part BBU 3200 is mainly configured to perform baseband processing, control the base station, and the like. The RRU 3100 and the BBU 3200 may be physically disposed together; or may be physically disposed separately, that is, the RRU 3100 and the BBU 3200 constitute a distributed base station.

The BBU 3200 is a control center of the base station, and may also be referred to as a processing unit. The BBU may be corresponding to the processing unit 1200 in FIG. 6, and is mainly configured to implement a baseband processing function, such as channel coding, multiplexing, modulation, and spread spectrum. The BBU (processing unit) may be configured to control the base station to perform an operation procedure related to the network device in the foregoing method embodiments, for example, generate the foregoing indication information.

In an example, the BBU 3200 may include one or more boards. A plurality of boards can jointly support a radio access network (such as an LTE network) in a single access standard, or each can support a radio access network (such as an LTE network, a 5G network, or another network) in a different access standard. The BBU 3200 further includes a memory 3201 and a processor 3202. The memory 3201 is configured store a necessary instruction and necessary data. The processor 3202 is configured to control the base station to perform necessary actions, for example, configured to control the base station to perform the operation procedure related to the network device in the foregoing method embodiments. The memory 3201 and the processor 3202 may serve one or more boards. In other words, a memory and a processor may be disposed on each board. Alternatively, a same memory and processor may be shared by a plurality of boards. In addition, a necessary circuit may further be disposed on each board.

It should be understood that the base station 3000 shown in FIG. 8 can implement various processes related to the network device in the method embodiment in FIG. 2 or FIG. 5. Operations and/or functions of various modules in the base station 3000 are used to implement corresponding procedures in the foregoing method embodiments. For details, refer to the descriptions in the foregoing method embodiments. To avoid repetition, detailed descriptions are omitted properly herein.

The BBU 3200 may be configured to perform actions that are implemented inside the network device and that are described in the foregoing method embodiments. The RRU 3100 may be configured to perform actions, described in the foregoing method embodiments, of sending information by the network device to the terminal device or receiving information by the network device from the terminal device. For details, refer to the descriptions in the foregoing method embodiments. Details are not described herein again.

An embodiment of this application further provides a processing apparatus, including a processor and an interface. The processor is configured to perform a communication method in any one of the foregoing method embodiments.

It should be understood that the processing apparatus may be one or more chips. For example, the processing apparatus may be a field programmable gate array (FPGA), an application-specific integrated chip (ASIC), a system on chip (SoC), a central processing unit (CPU), a network processor (NP), a digital signal processor (DSP), a micro controller unit (MCU), a programmable controller (PLD), or another integrated chip.

In an implementation process, operations in the foregoing methods can be implemented by using a hardware integrated logical circuit in the processor, or by using instructions in a form of software. The operations of the methods disclosed with reference to the embodiments of this application may be directly performed by a hardware processor, or may be performed by using a combination of hardware in a processor and a software module. The software module may be located in a mature storage medium in the art, such as a random access memory, a flash memory, a read-only memory, a programmable read-only memory, an electrically erasable programmable memory, or a register. The storage medium is located in the memory. The processor reads information in the memory and completes the operations in the foregoing methods in combination with hardware of the processor. To avoid repetition, details are not described herein again.

It should be noted that the processor in the embodiments of this application may be an integrated circuit chip and has a signal processing capability. In an implementation process, operations in the foregoing method embodiments can be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate, a transistor logic device, or a discrete hardware component. The processor may implement or perform the methods, the operations, and logical block diagrams that are disclosed in the embodiments of this application. The general-purpose processor may be a microprocessor, any conventional processor, or the like. The operations of the methods disclosed with reference to the embodiments of this application may be directly performed and completed by using a hardware decoding processor or a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and implements the operations in the foregoing methods in combination with hardware of the processor.

It should be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory of the systems and methods described in this specification includes but is not limited to these and any memory of another proper type.

Based on the methods provided in the embodiments of this application, this application further provides a computer program product. The computer program product includes computer program code. When the computer program code is run on a computer, the computer is enabled to perform the method in either of the embodiments shown in FIG. 2 and FIG. 5.

Based on the methods provided in the embodiments of this application, this application further provides a computer-readable medium. The computer-readable medium stores program code. When the program code is run on a computer, the computer is enabled to perform the method in either of the embodiments shown in FIG. 2 and FIG. 5.

Based on the methods provided in the embodiments of this application, this application further provides a system, including the foregoing one or more terminal devices and the foregoing one or more network devices.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the apparatus embodiments are corresponding to the network device and the terminal device in the method embodiments, and corresponding operations are performed by corresponding modules or units. For example, the communications unit (transceiver) performs receiving and sending operations in the method embodiments, and operations other than the receiving and sending operations may be performed by the processing unit (processor). For specific functions of the units, refer to the corresponding method embodiments. There may be one or more processors.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, in a distributed system, and/or across a network such as the Internet interacting with other systems by using the signal).

A person of ordinary skill in the art may be aware that, illustrative logical blocks (illustrative logical block) and operations described in combination with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be or may not be physical units, may be located in one position, or may be distributed on a plurality of network units. Some or all of the units may be selected based on actual requirements to achieve the objective of the solutions of the embodiments.

In addition, functional units in the embodiments of this application may be integrated into one processing unit, or each of the units may exist alone physically, or two or more units are integrated into one unit.

All or some of the functions of the functional units in the foregoing embodiments may be implemented by using software, hardware, firmware, or any combination thereof. When software is used to implement the embodiments, the embodiments may be implemented completely or partially in a form of a computer program product. The computer program product includes one or more computer instructions (programs). When the computer program instructions (programs) are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for enabling a computer device (which may be a personal computer, a server, a network device, or the like) to perform all or some of the operations of the methods described in the embodiments of this application. The storage medium includes: any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A parameter configuration method, comprising:
receiving an indication of a first mapping relationship, wherein the first mapping relationship is a mapping relationship in a preconfigured first mapping relationship group, the preconfigured first mapping relationship group comprises the first mapping relationship, and the first mapping relationship indicates a pair of a first value indicating a reporting quantity $L_0$ of spatial domain vectors and a second value indicating a reporting quantity $M_0$ of frequency domain vectors;
determining the reporting quantity $L_0$ of spatial domain vectors and the reporting quantity $M_0$ of frequency domain vectors based on the first mapping relationship, wherein both $L_0$ and $M_0$ are positive integers; and
determining, based on the reporting quantity $L_0$ of spatial domain vectors and the reporting quantity $M_0$ of frequency domain vectors, a quantity $K_0$ of space-frequency vector pairs for constructing a precoding vector, wherein:
$K_0 \leq 2L_0 \times M_0$, and $K_0$ is a positive integer;
$2L_0 \times M_0$ represents a sum of quantities of space-frequency vector pairs constructed in two polarization directions separately by using the $L_0$ spatial domain vectors and the $M_0$ frequency domain vectors; and
$K_0$ represents a sum of quantities of space-frequency vector pairs that are in the two polarization directions and that are for constructing the precoding vector.

2. The method according to claim 1, wherein the first mapping relationship further indicates a combination of the reporting quantity $L_0$ of spatial domain vectors, the reporting quantity $M_0$ of frequency domain vectors and a ratio between $K_0$ and $2L_0 \times M_0$.

3. The method according to claim 2, wherein the ratio between $K_0$ and $2L_0 \times M_0$ is one of the following: 1/4, 1/2 or 3/4.

4. The method according to claim 1, wherein the method further comprises:
determining a reporting quantity of space-frequency vector pairs, wherein the reporting quantity of space-frequency vector pairs is smaller than or equal to $K_0$.

5. The method according to claim 1, wherein the method further comprises:
receiving the indication of the first mapping relationship through radio resource control (RRC) signaling.

6. A communications apparatus, comprising:
at least one processor configured with processor-executable instructions to perform operations comprising:
receiving an indication of a first mapping relationship, wherein the first mapping relationship is a mapping relationship in a preconfigured first mapping relationship group, the preconfigured first mapping relationship group comprises the first mapping relationship, and the first mapping relationship indicates a pair of a first value indicating a reporting quantity $L_0$ of spatial domain vectors and a second value indicating a reporting quantity $M_0$ of frequency domain vectors;
determining the reporting quantity $L_0$ of spatial domain vectors and the reporting quantity $M_0$ of frequency domain vectors based on the first mapping relationship, wherein both $L_0$ and $M_0$ are positive integers; and determining, based on the reporting quantity $L_0$ of spatial domain vectors and the reporting quantity $M_0$ of frequency domain vectors, a quantity $K_0$ of space-frequency vector pairs for constructing a precoding vector, wherein:

$K_0 \leq 2L_0 \times M_0$, and $K_0$ is a positive integer;

$2L_0 \times M_0$ represents a sum of quantities of space-frequency vector pairs constructed in two polarization directions separately by using the $L_0$ spatial domain vectors and the $M_0$ frequency domain vectors; and $K_0$ represents a sum of quantities of space-frequency vector pairs that are in the two polarization directions and that are for constructing the precoding vector.

7. The communications apparatus according to claim 6, wherein the first mapping relationship further indicates a combination of the reporting quantity $L_0$ of spatial domain vectors, the reporting quantity $M_0$ of frequency domain vectors and a ratio between $K_0$ and $2L_0 \times M_0$.

8. The communications apparatus according to claim 7, wherein the ratio between $K_0$ and $2L_0 \times M_0$ is one of the following: 1/4, 1/2 or 3/4.

9. The communications apparatus according to claim 6, wherein the at least one processor is configured with processor-executable instructions to perform operations comprising:

determining a reporting quantity of space-frequency vector pairs, wherein the reporting quantity of space-frequency vector pairs is smaller than or equal to $K_0$.

10. The communications apparatus according to claim 6, wherein the at least one processor is configured with processor-executable instructions to perform operations comprising:

receiving the indication of the first mapping relationship through radio resource control (RRC) signaling.

11. A non-transitory computer-readable storage medium storing computer instructions, that when executed by at least one processor, cause the at least one processor to perform operations comprising:

receiving an indication of a first mapping relationship, wherein the first mapping relationship is a mapping relationship in a preconfigured first mapping relationship group, the preconfigured first mapping relationship group comprises the first mapping relationship, and the first mapping relationship indicates a pair of a first value indicating a reporting quantity $L_0$ of spatial domain vectors and a second value indicating a reporting quantity $M_0$ of frequency domain vectors;

determining the reporting quantity $L_0$ of spatial domain vectors and the reporting quantity $M_0$ of frequency domain vectors based on the first mapping relationship, wherein both $L_0$ and $M_0$ are positive integers; and determining, based on the reporting quantity $L_0$ of spatial domain vectors and the reporting quantity $M_0$ of frequency domain vectors, a quantity $K_0$ of space-frequency vector pairs for constructing a precoding vector, wherein:

$K_0 \leq 2L_0 \times M_0$, and $K_0$ is a positive integer;

$2L_0 \times M_0$ represents a sum of quantities of space-frequency vector pairs constructed in two polarization directions separately by using the $L_0$ spatial domain vectors and the $M_0$ frequency domain vectors; and $K_0$ represents a sum of quantities of space-frequency vector pairs that are in the two polarization directions and that are for constructing the precoding vector.

12. The non-transitory computer-readable storage medium according to claim 11, wherein the first mapping relationship further indicates a combination of the reporting quantity $L_0$ of spatial domain vectors, the reporting quantity $M_0$ of frequency domain vectors and a ratio between $K_0$ and $2L_0 \times M_0$.

13. The non-transitory computer-readable storage medium according to claim 12, wherein the ratio between $K_0$ and $2L_0 \times M_0$ is one of the following: 1/4, 1/2 or 3/4.

14. The non-transitory computer-readable storage medium according to claim 11, wherein the non-transitory computer-readable storage medium stores computer instructions, that when executed by the at least one processor, cause the at least one processor to perform operations comprising:

determining a reporting quantity of space-frequency vector pairs, wherein the reporting quantity of space-frequency vector pairs is smaller than or equal to $K_0$.

15. The non-transitory computer-readable storage medium according to claim 11, wherein the non-transitory computer-readable storage medium stores computer instructions, that when executed by the at least one processor, cause the at least one processor to perform operations comprising:

receiving the indication of the first mapping relationship through radio resource control (RRC) signaling.

* * * * *